United States Patent
Sun et al.

(10) Patent No.: US 10,631,329 B2
(45) Date of Patent: Apr. 21, 2020

(54) NON-COHERENT JOINT TRANSMISSION TECHNIQUES

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 15/674,076

(22) Filed: Aug. 10, 2017

(65) Prior Publication Data

US 2018/0049236 A1    Feb. 15, 2018

Related U.S. Application Data

(60) Provisional application No. 62/374,601, filed on Aug. 12, 2016.

(51) Int. Cl.
| | |
|---|---|
| *H04Q 7/00* | (2006.01) |
| *H04W 72/14* | (2009.01) |
| *H04L 5/00* | (2006.01) |
| *H04B 7/024* | (2017.01) |
| *H04B 7/0452* | (2017.01) |
| *H04B 7/06* | (2006.01) |
| *H04W 72/04* | (2009.01) |
| *H04W 88/02* | (2009.01) |

(52) U.S. Cl.
CPC ............ *H04W 72/14* (2013.01); *H04B 7/024* (2013.01); *H04B 7/0452* (2013.01); *H04B 7/0626* (2013.01); *H04L 5/0035* (2013.01); *H04L 5/0048* (2013.01); *H04W 72/042* (2013.01); *H04L 5/001* (2013.01); *H04W 88/02* (2013.01)

(58) Field of Classification Search
CPC ... H04W 72/14; H04W 72/042; H04W 88/02; H04B 7/024; H04B 7/0452; H04B 7/0626; H04L 5/0035; H04L 5/0048; H04L 5/001
USPC ................ 370/329, 252, 330, 341, 431, 437
See application file for complete search history.

(56) References Cited

U.S. PATENT DOCUMENTS 9,019,924 B2 * 4/2015 Ng ...................... H04W 72/042
                                                           370/329
9,236,985 B2 * 1/2016 Chen ........................ H04L 1/06
(Continued)

OTHER PUBLICATIONS

International Search Report and Written Opinion—PCT/US2017/046475—ISA/EPO—dated Nov. 21, 2017 (164840WO).
(Continued)

*Primary Examiner* — Marceau Milord
(74) *Attorney, Agent, or Firm* — Holland & Hart LLP

(57) ABSTRACT

Techniques for wireless communication at a user equipment (UE) are described. One method includes receiving a non-coherent joint transmission including at least a first transmission from a first transmit point and a second transmission from a second transmit point. The first transmission and the second transmission are received on overlapping sets of frequency resources. The method further includes processing the first transmission and the second transmission according to a set of receive parameters defined for separate component carriers (CCs) in a carrier aggregation (CA) mode.

30 Claims, 13 Drawing Sheets

(56) References Cited

U.S. PATENT DOCUMENTS

| | | | |
|---|---|---|---|
| 9,270,303 B2* | 2/2016 | Kahrizi | H04B 1/0067 |
| 9,762,372 B2* | 9/2017 | Ekpenyong | H04L 1/0031 |
| 9,948,363 B2* | 4/2018 | Kahrizi | H04B 1/0067 |
| 10,389,500 B2* | 8/2019 | Patel | H04B 7/0413 |
| 2010/0074208 A1* | 3/2010 | Farajidana | H04L 1/1621 370/329 |
| 2010/0100789 A1* | 4/2010 | Yu | H03M 13/114 714/752 |
| 2010/0111226 A1* | 5/2010 | Ko | H04B 7/0639 375/299 |
| 2010/0195624 A1* | 8/2010 | Zhang | H04B 7/0413 370/335 |
| 2011/0103498 A1* | 5/2011 | Chen | H04L 1/06 375/260 |
| 2011/0228732 A1* | 9/2011 | Luo | H04L 5/001 370/329 |
| 2011/0243066 A1* | 10/2011 | Nayeb Nazar | H04L 1/007 370/328 |
| 2011/0292826 A1* | 12/2011 | Ahn | H04W 52/16 370/252 |
| 2012/0106473 A1* | 5/2012 | Tiirola | H04L 5/0048 370/329 |
| 2013/0064216 A1* | 3/2013 | Gao | H04L 5/0016 370/330 |
| 2013/0114525 A1* | 5/2013 | Ahmadi | H04L 5/0053 370/329 |
| 2014/0036810 A1* | 2/2014 | Harrison | H04W 72/042 370/329 |
| 2014/0133395 A1* | 5/2014 | Nam | H04B 7/0452 370/328 |
| 2014/0233407 A1* | 8/2014 | Pourahmadi | H04L 5/0007 370/252 |
| 2014/0301252 A1* | 10/2014 | Choi | H04B 7/265 370/278 |
| 2014/0369242 A1* | 12/2014 | Ng | H04W 72/0453 370/280 |
| 2015/0189574 A1* | 7/2015 | Ng | H04W 24/08 370/252 |
| 2016/0127911 A1 | 5/2016 | Yiu et al. | |
| 2016/0218832 A1* | 7/2016 | Dabeer | H04L 1/1621 |
| 2017/0086216 A1* | 3/2017 | Patil | H04W 72/1242 |
| 2017/0208574 A1* | 7/2017 | Ramakrishna | H04L 5/0055 |
| 2017/0238305 A1* | 8/2017 | Chen | H04W 72/0413 370/311 |
| 2017/0264408 A1* | 9/2017 | Patel | H04B 7/0413 |
| 2017/0289869 A1* | 10/2017 | Nogami | H04W 36/0066 |
| 2017/0302419 A1* | 10/2017 | Liu | H04W 48/12 |
| 2018/0192397 A1* | 7/2018 | Seo | H04W 72/02 |
| 2018/0220425 A1* | 8/2018 | Zhang | H04W 72/00 |
| 2018/0287761 A1* | 10/2018 | You | H04L 5/00 |
| 2019/0068352 A1* | 2/2019 | Xiong | H04L 5/0051 |
| 2019/0116615 A1* | 4/2019 | Harada | H04W 16/14 |
| 2019/0124631 A1* | 4/2019 | Ren | H04W 76/27 |

OTHER PUBLICATIONS

Mediatek Inc: "Multiple CSI in Periodic Feedback for CoMP", 3GPP Draft; R1-123334, 3rd Generation Partnership Project (3GPP), Mobile Competence Centre, 650, Route Des Lucioles, F-06921 Sophia-Antipolis Cedex, France, vol. RAN WG1. No. Qingdao, China; Aug. 5, 2012, XP050661218, Retrieved from the Internet: URL:http://www.3gpp.org/ftp/tsg_ran/WG1_RL1/TSGR1_70/Docs/ [retrieved on Aug. 5, 2012], 4 pages.

Nokia Siemens Networks et al., "Cell Aggregation: A Unified Approach to CoMP and Carrier Aggregation", 3GPP Draft; R1-112390, 3rd Generation Partnership Project (3GPP), Mobile Competence Centre, 650, Route Des Lucioles, F-06921 Sophia-Antipolis Cedex, France, vol. RAN WG1. No. Athens. Greece; Aug. 17, 2011, XP050537773, [retrieved on Aug. 17, 2011], 7 pages.

Nokia Siemens Networks et al., "CoMP Performance in Non-Ideal Backhaul", 3GPP Draft; R1-112391, 3rd Generation Partnership Project (3GPP), Mobile Competence Centre, 650, Route Des Lucioles, F-06921 Sophia-Antipolis Cedex, France, vol. RAN WG1, No. Athens, Greece; Aug. 16, 2011, XP050537512, [retrieved on Aug. 16, 2011], 5 pages.

* cited by examiner

NON-COHERENT JOINT TRANSMISSION TECHNIQUES

CROSS REFERENCES

The present Application for Patent claims priority to U.S. Provisional Patent Application No. 62/374,601 by SUN, et al., entitled "Non-Coherent Joint Transmission Techniques," filed Aug. 12, 2016, assigned to the assignee hereof.

BACKGROUND

Field of the Disclosure

The present disclosure, for example, relates to wireless communication systems, and more particularly to non-coherent joint transmission (NCJT) techniques.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of access points (e.g., base stations), each simultaneously supporting communication for multiple communication devices, otherwise known as user equipment (UEs). A base station may communicate with UEs on downlink channels (e.g., downlinks, for transmissions from a base station to a UE) and uplink channels (e.g., uplinks, for transmissions from a UE to a base station).

In some cases, a UE may communicate with more than one base station using coordinated multi point (CoMP) operations. Joint transmission CoMP operations may be based on coherent joint transmissions or NCJT transmissions.

SUMMARY

To increase the flexibility of NCJT transmissions, and in some cases, to increase the flexibility of NCJT transmissions using existing (or new) hardware, the component transmissions of an NCJT transmission (e.g., a first transmission from a first transmit point (e.g., a base station) and a second transmission from a second transmit point) may be transmitted and received according to parameters defined for separate component carriers (CCs) in a carrier aggregation (CA) mode (e.g., a Long Term Evolution (LTE)/LTE-Advanced (LTE-A) CA mode).

In one example, a method for wireless communication at a UE is described. The method may include receiving a non-coherent joint transmission including at least a first transmission from a first transmit point and a second transmission from a second transmit point. The first transmission and the second transmission may be received on overlapping sets of frequency resources. The method may also include processing the first transmission and the second transmission according to a set of receive parameters defined for separate CCs in a CA mode.

In one example, an apparatus for wireless communication at a UE is described. The apparatus may include means for receiving a non-coherent joint transmission including at least a first transmission from a first transmit point and a second transmission from a second transmit point. The first transmission and the second transmission may be received on overlapping sets of frequency resources. The apparatus may also include means for processing the first transmission and the second transmission according to a set of receive parameters defined for separate CCs in a CA mode.

In one example, an apparatus for wireless communication at a UE is described. The apparatus may include a processor, and memory in electronic communication with the processor. The processor and the memory may be configured to receive a non-coherent joint transmission including at least a first transmission from a first transmit point and a second transmission from a second transmit point. The first transmission and the second transmission may be received on overlapping sets of frequency resources. The processor and the memory may also be configured to process the first transmission and the second transmission according to a set of receive parameters defined for separate CCs in a CA mode.

In one example, a non-transitory computer-readable medium storing computer-executable code for wireless communication at a UE is described. The code may be executable by a processor to receive a non-coherent joint transmission including at least a first transmission from a first transmit point and a second transmission from a second transmit point. The first transmission and the second transmission may be received on overlapping sets of frequency resources. The code may also be executable by the processor to process the first transmission and the second transmission according to a set of receive parameters defined for separate CCs in a CA mode.

Some examples of the method, apparatus, and computer-readable medium described above may further include processes, features, means, instructions, or code for receiving at least one of independent resource allocations for the first transmission and the second transmission, independent scheduling decisions for the first transmission and the second transmission, or a combination thereof.

Some examples of the method, apparatus, and computer-readable medium described above may further include processes, features, means, instructions, or code for receiving the first transmission and the second transmission using a same receive chain.

Some examples of the method, apparatus, and computer-readable medium described above may further include processes, features, means, instructions, or code for receiving the first transmission and the second transmission in accordance with independent transmission modes.

Some examples of the method, apparatus, and computer-readable medium described above may further include processes, features, means, instructions, or code for receiving one codeword or two codewords in each of the first transmission and the second transmission.

Some examples of the method, apparatus, and computer-readable medium described above may further include processes, features, means, instructions, or code for receiving the first transmission in accordance with a first resource allocation, and receiving the second transmission in accordance with a second resource allocation. The first resource allocation and the second resource allocation may be non-aligned.

In some examples of the method, apparatus, and computer-readable medium described above, the processing of the first transmission and the second transmission may include jointly processing the first transmission and the second transmission. In some of these examples, the method, apparatus, and computer-readable medium described above may further include processes, features, means, instructions, or code for sampling the non-coherent joint transmission; performing a single Fourier transform on a set of samples of the non-coherent joint transmission; and de-mapping the first transmission and the second transmission from the single Fourier transform.

In some examples of the method, apparatus, and computer-readable medium described above, the processing of the first transmission and the second transmission may include separately processing the first transmission and the second transmission. In some of these examples, the method, apparatus, and computer-readable medium described above may further include processes, features, means, instructions, or code for sampling the non-coherent joint transmission; performing, for the first transmission, a first Fourier transform on a first set of samples of the non-coherent joint transmission; performing, for the second transmission, a second Fourier transform on a second set of samples of the non-coherent joint transmission, wherein the second set differs from the first set; and separately de-mapping the first transmission from the first Fourier transform and the second transmission from the second Fourier transform.

Some examples of the method, apparatus, and computer-readable medium described above may further include processes, features, means, instructions, or code for determining to process the first transmission and the second transmission jointly or separately based at least in part on: a configuration of the non-coherent joint transmission, or an indication received from the first transmit point or the second transmit point.

Some examples of the method, apparatus, and computer-readable medium described above may further include processes, features, means, instructions, or code for receiving orthogonal demodulation reference signals (DMRSs) as part of the first transmission and the second transmission. The orthogonal DMRSs may be based at least in part on a multi-user multiple input multiple output (MU-MIMO) DMRS configuration, a frequency domain multiplexed DMRS configuration, or a code division multiplexed (CDM) DMRS configuration.

In some examples of the method, apparatus, and computer-readable medium described above, the first transmission and the second transmission may be associated with a same virtual cell identity (VCI) or different VCIs.

Some examples of the method, apparatus, and computer-readable medium described above may further include processes, features, means, instructions, or code for managing a first channel state information (CSI) process for a first resource allocation associated with the first transmit point, and managing a second CSI process for a second resource allocation associated with the second transmit point.

Some examples of the method, apparatus, and computer-readable medium described above may further include processes, features, means, instructions, or code for managing a joint CSI process for a same resource allocation associated with the first transmit point and the second transmit point. In some examples of the method, apparatus, and computer-readable medium described above, the management of the joint CSI process may include managing a first component CSI process associated with the first transmit point, and managing a second component CSI process associated with the second transmit point.

Some examples of the method, apparatus, and computer-readable medium described above may further include processes, features, means, instructions, or code for monitoring for downlink control information (DCI) in a first physical downlink control channel (PDCCH) region associated with the first transmit point, and in a second PDCCH region associated with the second transmit point. In some examples of the method, apparatus, and computer-readable medium described above, the first transmit point and the second transmit point may be associated with different cell identities, and the first PDCCH region and the second PDCCH region may include overlapping sets of resources. In some examples of the method, apparatus, and computer-readable medium described above, the first transmit point and the second transmit point may be associated with a same cell identity, and the first PDCCH region and the second PDCCH region may include different sets of resources.

Some examples of the method, apparatus, and computer-readable medium described above may further include processes, features, means, instructions, or code for monitoring for DCI received on a first enhanced physical downlink control channel (ePDCCH) region associated with the first transmit point and a second ePDCCH region associated with the second transmit point. In these examples, the first ePDCCH and the second ePDCCH may be frequency domain multiplexed.

Some examples of the method, apparatus, and computer-readable medium described above may further include processes, features, means, instructions, or code for triggering a transmission of a sounding reference signal (SRS) based at least in part on first DCI received from the first transmit point, and refraining from triggering transmission of the SRS based at least in part on second DCI received from the second transmit point.

Some examples of the method, apparatus, and computer-readable medium described above may further include processes, features, means, instructions, or code for triggering a transmission of a SRS based at least in part on first DCI received from the first transmit point, second DCI received from the second transmit point, or a combination thereof.

Some examples of the method, apparatus, and computer-readable medium described above may further include processes, features, means, instructions, or code for transmitting the SRS based at least in part on a first set of SRS parameters associated with the first transmit point when the SRS is triggered based at least in part on the first DCI, a second set of SRS parameters associated with the second transmit point when the SRS is triggered based at least in part on the second DCI, or a same set of SRS parameters associated with the first transmit point and the second transmit point when the SRS is triggered based at least in part on the first DCI and the second DCI.

Some examples of the method, apparatus, and computer-readable medium described above may further include processes, features, means, instructions, or code for receiving at least one uplink grant for an uplink transmission on a single uplink channel, the at least one uplink grant including a first uplink grant received from the first transmit point, a second uplink grant received from the second transmit point, or a combination thereof. In some examples of the method, apparatus, and computer-readable medium described above, the first uplink grant and the second uplink grant may be received and have a same content.

Some examples of the method, apparatus, and computer-readable medium described above may further include processes, features, means, instructions, or code for transmitting a second non-coherent joint transmission including at least a third transmission to the first transmit point and a fourth transmission to the second transmit point. In some examples, the method, apparatus, and computer-readable medium described above may further include processes, features, means, instructions, or code for processing the third transmission and the fourth transmission using different precoders.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Some wireless communication systems may use CoMP transmissions in which two or more transmit points (e.g., base stations) may transmit data to a user equipment (UE). Such CoMP transmissions may use several CoMP schemes, including dynamic point selection (DPS) in which different base stations transmit data to a UE at different times, joint transmission (JT) in which two or more base stations contemporaneously transmit data to a UE, and coordinated beamforming (CBF) in which two or more base stations coordinate signal transmissions that reduce interference between the two or more base stations and/or with nodes in adjacent cells.

Some aspects of the techniques described herein pertain to the use of CA techniques to process NCJT transmissions. At a UE, the techniques include processing the transmissions of different transmit points according to a set of receive parameters defined for separate CCs in a CA mode.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the operations of the described methods may be performed in an order different from that described, and various operations may be added, omitted, or combined. Also, features described with respect to some examples may be combined in other examples.

Figure 1:
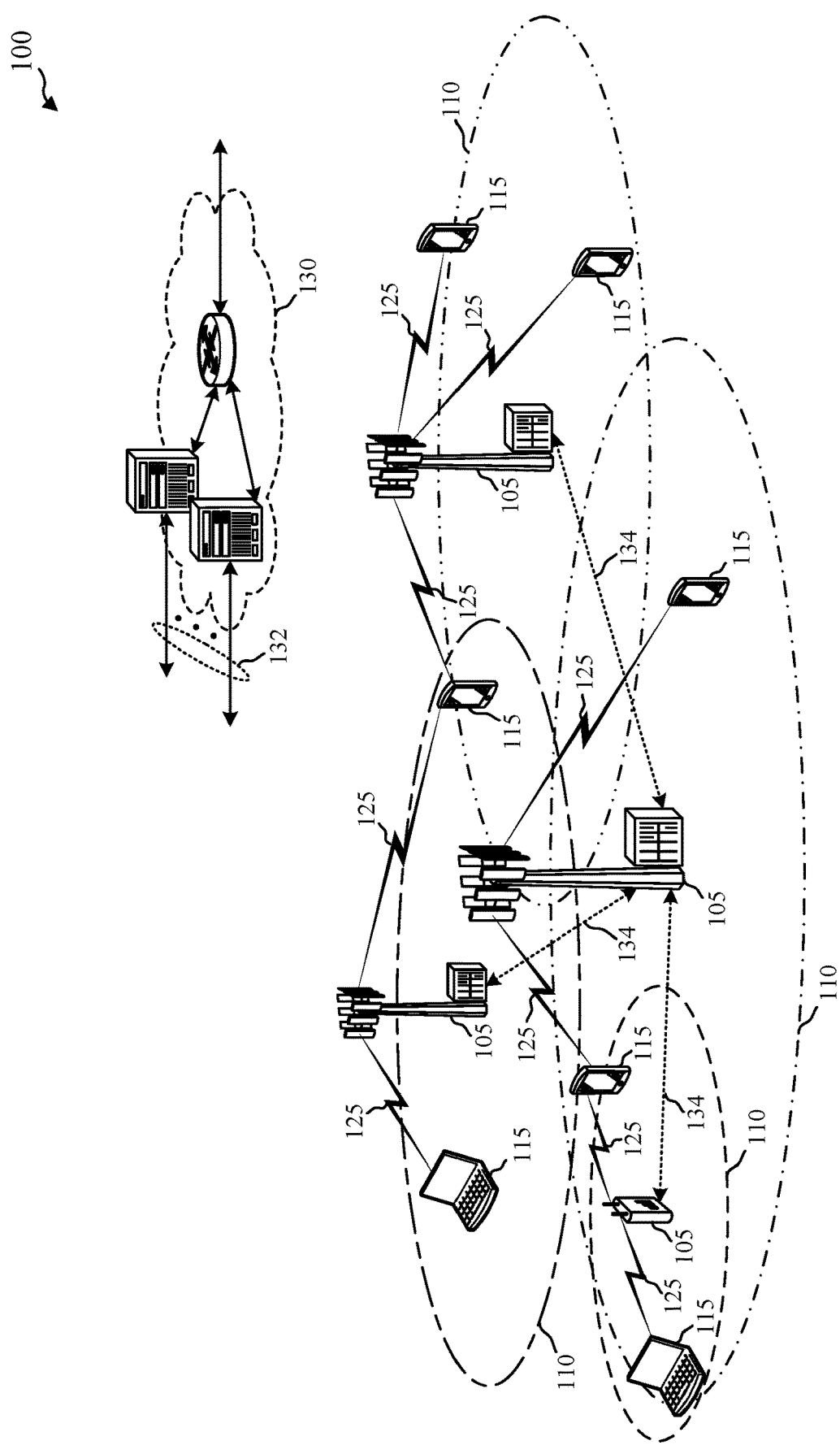
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include a plurality of access points (e.g., base stations 105), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a TDD operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

Figure 2:
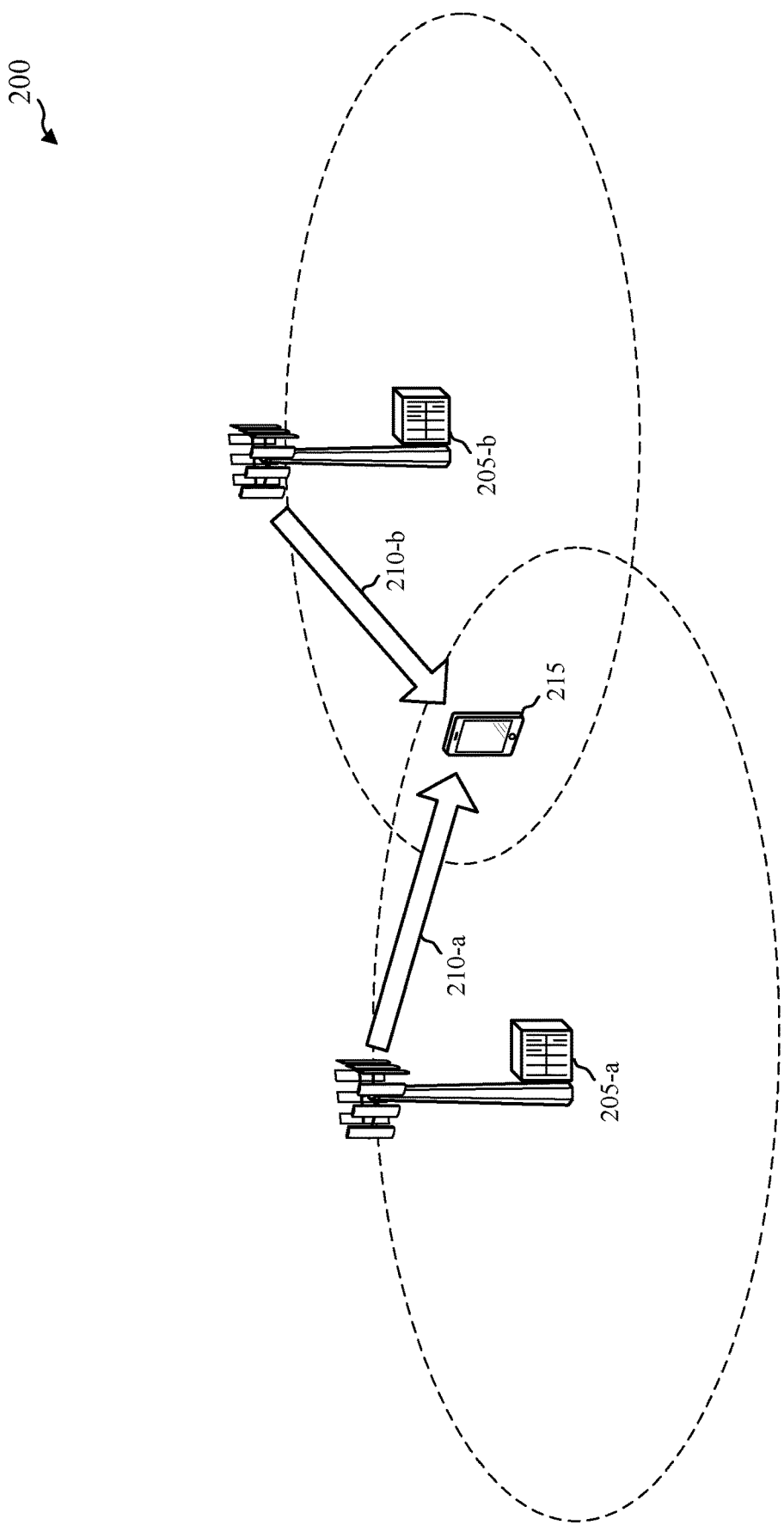
FIG. 2 illustrates an example of a wireless communication system in which a UE receives a NCJT from a plurality of transmit points, in accordance with various aspects of the present disclosure.

FIG. 2 illustrates an example of a wireless communication system 200 in which a UE 215 receives a NCJT from a plurality of transmit points, in accordance with various aspects of the present disclosure. In some examples, the wireless communication system 200 may represent aspects of the wireless communication system 100 described with reference to FIG. 1. The wireless communication system 200 may include a first transmit point 205-a, a second transmit point 205-b, and a UE 215. The first transmit point 205-a and second transmit point 205-b may be examples of aspects of the base stations 105 described with reference to FIG. 1. The UE 215 may be an example of aspects of the UEs 115 described with reference to FIG. 1.

In some examples, the UE 215 may receive a NCJT. The NCJT may include at least a first transmission 210-a from the first transmit point 205-a and a second transmission 210-b from the second transmit point 205-b. The first transmission 210-a and the second transmission 210-b may be received on overlapping sets of frequency resources. In one example, the overlapping sets of frequency resources may be a same set of frequency resources.

The UE 215 may process the first transmission 210-a and the second transmission 210-b according to a set of receive parameters defined for separate CCs in a CA mode. Processing the first transmission 210-a and the second transmission 210-b according to a set of receive parameters defined for separate CCs in a CA mode allows the first transmit point 205-a and the second transmit point 205-b to make independent resource allocations and/or scheduling decisions for the first transmission 210-a and the second transmission 210-b.

There may be more or less coordination between the first transmit point 205-a and the second transmit point 205-b. A serving cell may be selected or designated among the first transmit point 205-a and the second transmit point 205-b in a semi-static or dynamic manner. In some examples, processing the first transmission 210-a and the second transmission 210-b according to a set of receive parameters defined for separate CCs in a CA mode may reduce the CC capability of the UE 215. For example, the UE 215 may communicate with the first transmit point 205-a in a CA mode (not shown) while receiving the second transmission 210-b from the second transmit point 205-b, but the number of CCs on which the UE 215 may communicate with the first transmit point 205-a in the CA mode may be reduced because of the UE's receipt of the second transmission 210-b from the second transmit point 205-b.

Despite processing the first transmission 210-a and the second transmission 210-b according to a set of receive parameters defined for separate CCs in a CA mode, the first transmission 210-a (e.g., a first PDSCH) and the second transmission 210-b (e.g., a second PDSCH) may be received using the same receive chain of the UE 215. However, depending on the amount of coordination between the first transmit point 205-a and the second transmit point 205-b, the first transmission 210-a and the second transmission 210-b may be processed jointly (e.g., based on a single time tracking loop (TTL)) or separately (e.g., based on a first TTL for the first transmission 210-a and a second TTL for the second transmission 210-b).

In some examples, each of the first transmit point 205-a and the second transmit point 205-b may transmit a separate PDSCH to the UE 215, and each PDSCH may be based on a separate grant. In some examples, the separate PDSCHs may be transmitted using the same transmit mode (TM). In other examples, the separate PDSCHs may be transmitted using separate TMs. When the TMs for the separate PDSCHs differ, the TMs may be based on different cell-specific reference signals (CRSs) or different demodulation reference signals (DMRSs), or may include a mix of CRS-based and DMRS-based TMs. In some examples, each PDSCH may be associated with up to two codewords (CWs).

The resource allocations for the separate PDSCHs may or may not be aligned. Alignment of the resource allocations may enable the use of a higher modulation and coding scheme (MCS) for each PDSCH. In some examples, the alignment of resource allocations may be achieved using a CoMP scenario 3/4, or using a separate outer loop backoff, or in another way that provides coordination between transmit points.

The first transmission 210-a from the first transmit point 205-a and the second transmission 210-b from the second transmit point 205-b may or may not be aligned or have tight timing (e.g., timings within a cyclic prefix (CP) range). In either case, when the first transmit point 205-a transmits a first PDSCH and the second transmit point 205-b transmits a second PDSCH, the PDSCH transmitted by the other transmit point, including its CRS or DMRS, may be treated as interference by the UE 215 when processing the other PDSCH. However, when resource allocations for the PDSCHs are sufficiently aligned (e.g., are aligned or have tight timing (e.g., timings within a CP range)), the PDSCHs may be jointly processed by the UE 215. In some examples, transmit points that are physically close or joined by a fiber communication link may be able to align their PDSCH transmissions or transmit non-aligned PDSCH transmissions with tight timing.

When a first PDSCH transmitted by the first transmit point 205-a and a second PDSCH transmitted by the second transmit point 205-b are aligned or have tight timing, the first PDSCH and the second PDSCH may be received, by the UE 215, using the same receive chain. The first PDSCH and the second PDSCH may also be jointly processed. For example, a single set of samples may be acquired for a NCJT including the first PDSCH and the second PDSCH, and a single Fourier transform (e.g., a Fast Fourier Transform (FFT)) may be performed on the set of samples. The first PDSCH and second PDSCH may then be de-mapped from the single Fourier transform. A single (or joint) TTL may be used to track both transmit points.

When a first PDSCH transmitted by the first transmit point 205-a and a second PDSCH transmitted by the second transmit point 205-b are non-aligned and have loose timing (e.g., timings outside a CP range), the first PDSCH and the second PDSCH may be received, by the UE 215, using the same receive chain, but the first PDSCH and the second PDSCH may be separately processed. For example, a single set of samples may be acquired for a NCJT including the first PDSCH and the second PDSCH, but separate Fourier transforms (e.g., separate FFTs) may need to be performed on the set of samples for the first PDSCH and the second PDSCH. For example, a first Fourier transform may be performed on a first set of the acquired samples for the first PDSCH, and a second Fourier transform may be performed on a second set of the acquired samples for second PDSCH. The first PDSCH and second PDSCH may then be separately de-mapped from their separate Fourier transforms. A first TTL may be used to track the first transmit point 205-a, and a second TTL may be used to track the second transmit point 205-b.

In some examples, the UE 215 may determine to process the first transmission 210-a and the second transmission 210-b jointly or separately based at least in part on a configuration of the NCJT (e.g., a configuration that includes processing the first transmission 210-a and the second transmission 210-b according to a set of receive parameters defined for separate CCs in a CA mode), or an indication received from the first transmit point 205-a or the second transmit point 205-b (e.g., an indication of whether the first transmission 210-a and the second transmission 210-b are aligned or have tight timing (e.g., a flag)).

In some examples, the first transmission 210-a from the first transmit point 205-a and the second transmission 210-b from the second transmit point 205-b may each be associated with a DMRS. Orthogonalization of the DMRS for the first transmission 210-a and the second transmission 210-b may improve channel estimation and mitigate channel geometry loss. In some examples, the DMRS may be orthogonalized using a multi-user multiple input multiple output (MU-MIMO) DMRS configuration. However, orthogonalization of DMRS using a MU-MIMO configuration may require a minimum level of coordination between the first transmit point 205-a and the second transmit point 205-b. When such coordination is not practical or available, DMRS for the first transmission 210-a and the second transmission 210-b may be orthogonalized based at least in part on frequency domain multiplexing (FDM) techniques, code division multiplexing (CDM) techniques, etc. The first transmission 210-a and the second transmission 210-b may be associated with a same virtual cell identity (VCI) or different VCIs.

The UE 215 may compile and transmit channel state information (CSI) to the first transmit point 205-a and/or second transmit point 205-b. In some examples, the UE 215 may manage a first CSI process for a first resource allocation associated with the first transmit point 205-a, and manage a second CSI process for a second resource allocation associated with the second transmit point 205-b (e.g., similarly to how a per CC report is compiled for a transmit point operating in a CA mode). Each CSI process may assume the other transmit point is interfering, and in some cases may be pessimistic if the resource allocations for the transmit points are not aligned or do not have tight timing. Alternatively, the UE 215 may manage a joint CSI process for a same resource allocation associated with the first transmit point 205-a and the second transmit point 205-b. In some examples, management of the joint CSI process may include managing a first component CSI process associated with the first transmit point 205-a, and managing a second component CSI process associated with the second transmit point 205-b.

Downlink grants for the first transmission 210-a and the second transmission 210-b may be transmitted similarly to downlink grants transmitted in an LTE/LTE-A network if the DMRS used by the first transmission 210-a and the second transmission 210-b are configured similarly to DMRS for CCs in a CA mode transmission. In some examples, the first transmission 210-a and the second transmission 210-b may be cross-CC scheduled, and the UE 215 may employ per CC PDCCH decoding.

The UE 215 may monitor for DCI in a first PDCCH region associated with the first transmit point 205-a, and in a second PDCCH region associated with the second transmit point 205-b. One example of a PDCCH region may be a control resource set (CORESET). When the first transmit point 205-a and the second transmit point 205-b are associated with different cell identities (IDs), the first PDCCH region and the second PDCCH region may include overlapping sets of resources. A larger aggregation level (AL) may be used when inter-transmit point interference makes it harder to decode the first PDCCH region and the second PDCCH region. Alternatively, DCI may be transmitted in an enhanced physical downlink control channel (ePDCCH), and FDM techniques may be used to reduce inter-transmit point interference when transmitting DCI for the first transmit point 205-a and the second transmit point 205-b.

When the first transmit point 205-a and the second transmit point 205-b are associated with a same cell ID (e.g., in a CoMP scenario 4), the first PDCCH region and the second PDCCH region may include different sets of resources, and the UE 215 may monitor for separate downlink grants in the first PDCCH region and the second PDCCH region.

In some examples, transmit power command (TPC) fields in the DCI for a NCJT may be configured similarly to TPC fields used in a CA mode, in which the TPC field in the DCI for one transmission carries a TPC, and the TPC field in the DCI for the other transmission indicates an acknowledgement/non-acknowledgement (A/N) resource selection. CSI triggering may also be configured for a NCJT similarly to CSI triggering used in a CA mode.

In some examples, DCI received from the first transmit point 205-a and/or the second transmit point 205-b may trigger a transmission of a sounding reference signal (SRS) by the UE 215. In some examples, the first transmit point 205-a may be treated as a transmit point transmitting a CC paired with an uplink CC, and the second transmit point 205-b may be treated as a transmit point transmitting a CC not paired with an uplink CC. In these examples, SRS may not be triggered by the DCI of the second transmit point 205-b. In other examples, DCI received from either or both of the first transmit point 205-a and the second transmit point 205-b may trigger a transmission of an SRS by the UE 215. In these examples, SRS parameters may be separately configured for the first transmit point 205-a and the second transmit point 205-b. If both the first transmit point 205-a and the second transmit point 205-b trigger a SRS transmission by the UE 215 during a subframe (or transmission time interval (TTI)), the dual triggers may be treated as an error case unless the SRS parameters for both the first transmit point 205-a and the second transmit point 205-b are the same.

Figure 3:
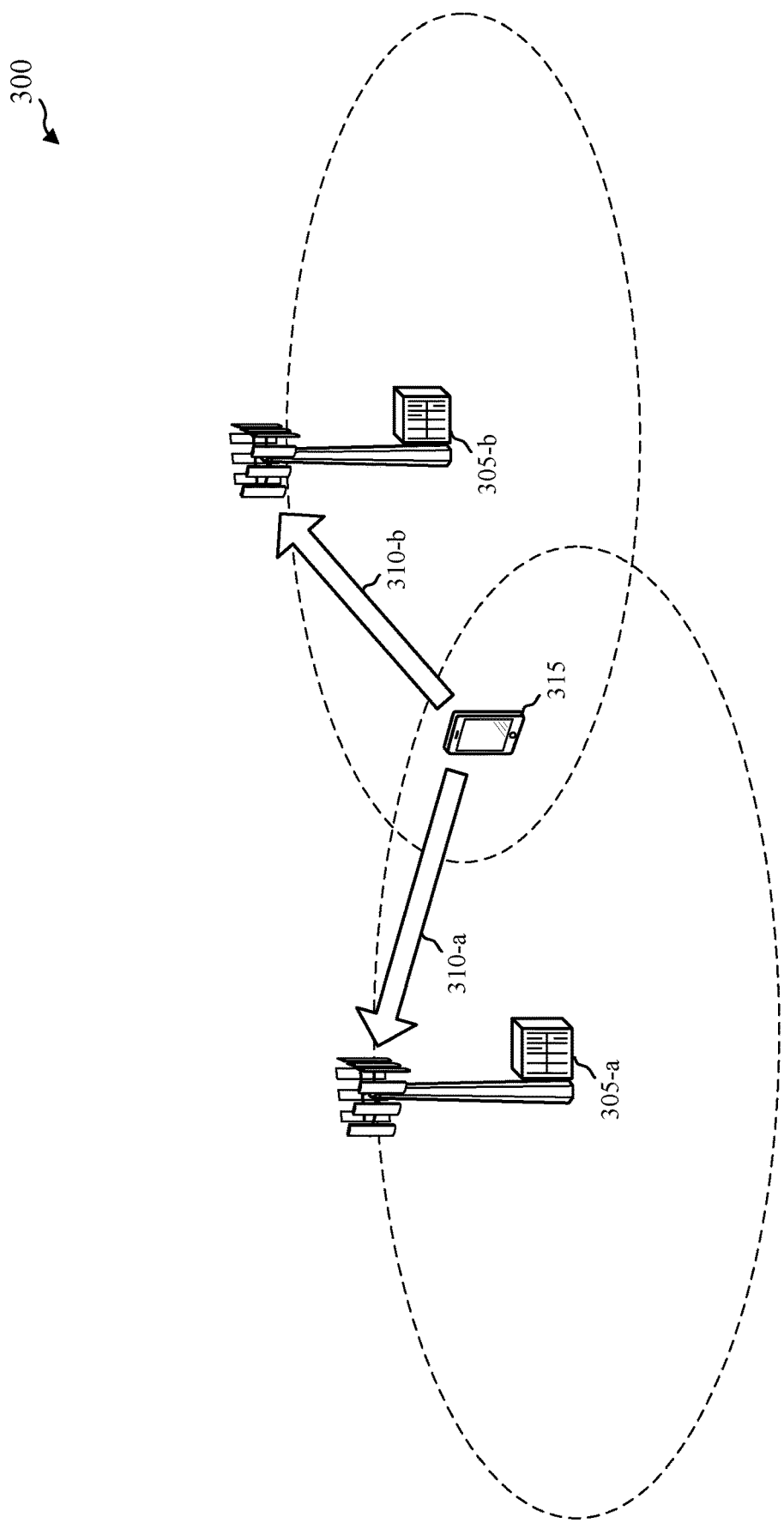
FIG. 3 illustrates an example of a wireless communication system in which a UE transmits an uplink transmission to one or more transmit points, in accordance with various aspects of the present disclosure.

FIG. 3 illustrates an example of a wireless communication system 300 in which a UE 315 transmits an uplink transmission to one or more transmit points, in accordance with various aspects of the present disclosure. In some examples, the wireless communication system 300 may represent aspects of the wireless communication system 100 or 200 described with reference to FIG. 1 or 2. The wireless communication system 200 may include a first transmit point 305-a, a second transmit point 305-b, and a UE 315. The first transmit point 305-a and second transmit point 305-b may be examples of aspects of the base stations 105 described with reference to FIG. 1, or aspects of the transmit points 205-a or transmit point 205-b described with reference to FIG. 2. The UE 315 may be an example of aspects of the UEs 115 or 215 described with reference to FIG. 1 or 2.

In some examples, the UE 315 may receive a NCJT from the first transmit point 305-a and the second transmit point 305-b, as described with reference to FIG. 2. The NCJT may include at least a first transmission from the first transmit point 305-a and a second transmission from the second transmit point 305-b. The first transmission and the second transmission may be received on overlapping sets of frequency resources. In one example, the overlapping sets of frequency resources may be a same set of frequency resources.

The UE 315 may also transmit to the first transmit point 305-*a* and/or the second transmit point 305-*b*. In some examples, the UE 315 may receive an uplink grant for an uplink transmission to be transmitted on a single uplink channel, to the first transmit point 305-*a*, to the second transmit point 305-*b*, or to another transmit point (not shown). In these examples, the uplink grant may include a first uplink grant received from the first transmit point 305-*a*, a second uplink grant received from the second transmit point 305-*b*, or a combination thereof. In some examples, each of the first transmit point 305-*a* and the second transmit point 305-*b* may transmit uplink grants with the same content to the UE 315, to improve the reliability of uplink grant transmission. The UE 315 need only detect and decode one of the uplink grants to make an uplink transmission in accordance with the uplink grants.

In some examples, the UE 315 may additionally or alternatively transmit a NCJT to the first transmit point 305-*a* and the second transmit point 305-*b*. In these examples, the UE 315 may transmit a third transmission 310-*a* to the first transmit point 305-*a* and a fourth transmission 310-*b* to the second transmit point 305-*b*. The first transmit point 305-*a* may process the third transmission 310-*a* separately from the second transmit point 305-*b* and fourth transmission 310-*b* (and vice versa). If the UE 315 has multiple transmit antennas, the UE 315 may use different precoders to process the third transmission 310-*a* and the fourth transmission 310-*b*.

In some examples, a UE 315 may receive and transmit NCJTs according to the techniques described with reference to FIGS. 2 and 3 in a dual connectivity scenario.

Although the present disclosure describes techniques for receiving transmissions from two different transmit points and processing the transmissions according to a set of receive parameters defined for separate CCs in a CA mode, the described techniques may be applied to scenarios in which a UE 315 receives transmissions from more than two transmit points and processes the transmissions according to a set of receive parameters defined for separate CCs in a CA mode.

Figure 4:
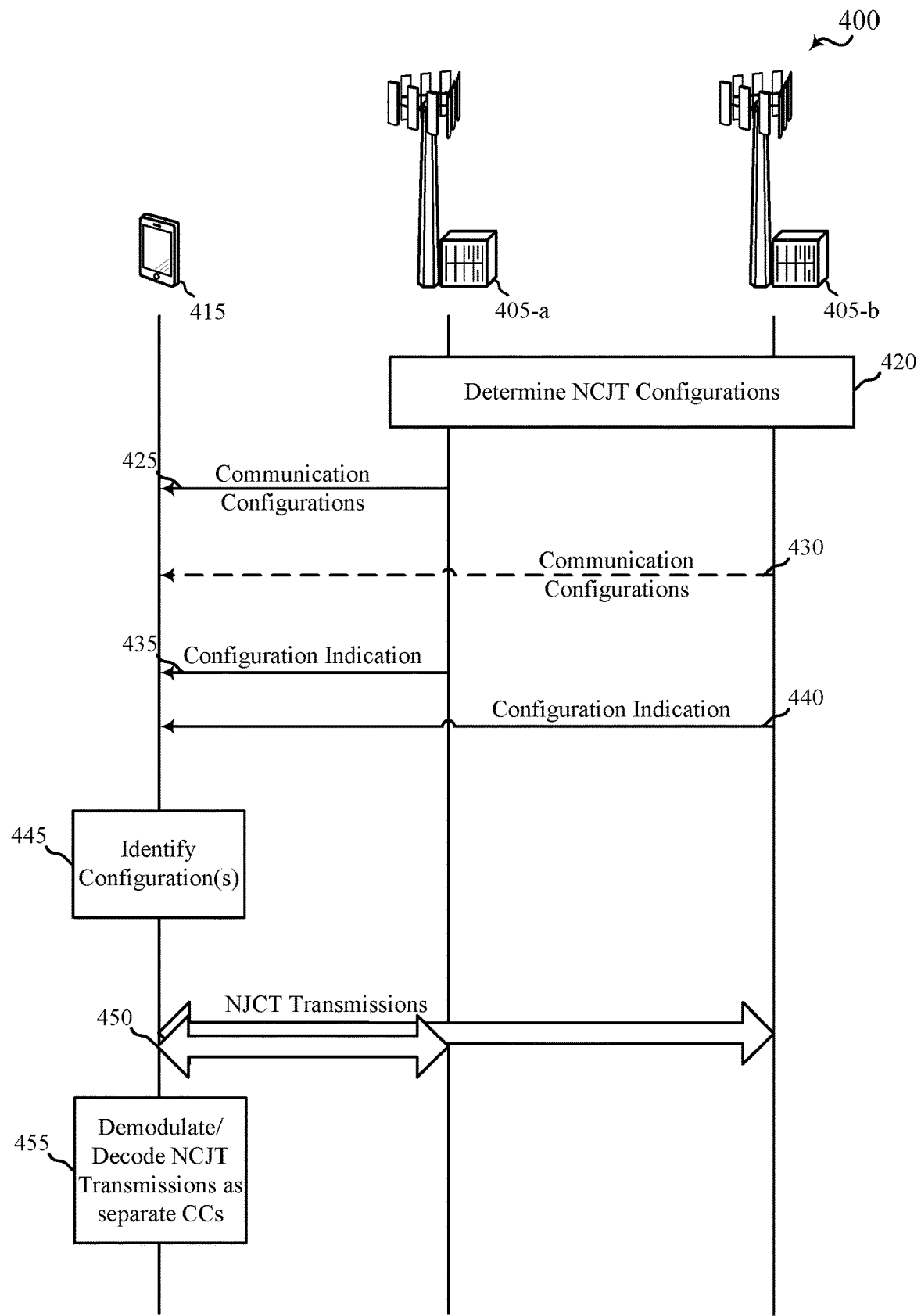
FIG. 4 illustrates an example of a process flow 40 in which a UE may receive a NCJT from a plurality of transmit points, or transmit a NCJT to a plurality of transmit points, in accordance with various aspects of the present disclosure.

FIG. 4 illustrates an example of a process flow 400 in which a UE 415 may receive a NCJT from a plurality of transmit points, or transmit a NCJT to a plurality of transmit points, in accordance with various aspects of the present disclosure. The process flow 400 may be performed by a first transmit point 405-*a*, a second transmit point 405-*b*, and a UE 415. The first transmit point 405-*a* and second transmit point 405-*b* may be examples of aspects of the base stations 105 described with reference to FIG. 1, or aspects of the transmit points 205-*a*, 205-*b*, 305-*a*, or 305-*b* described with reference to FIG. 2 or 3. The UE 415 may be an example of aspects of the UEs 115, 215, or 315 described with reference to FIG. 1, 2, or 3.

At 420, a transmit point (e.g., the first transmit point 405-*a* or the second transmit point 405-*b*) may determine a set of communication configurations associated with a plurality of transmit points 405 (e.g., the first transmit point 405-*a* and the second transmit point 405-*b*), where at least one of the set of communication configurations is based on processing a NCJT received from the first transmit point 405-*a* and the second transmit point 405-*b* according to a set of receive parameters defined for separate CCs in a CA mode. The determination of the set of configurations may be made separately or jointly by the first transmit point 405-*a*, the second transmit point 405-*b*, or both. In some examples, the first transmit point 405-*a* and the second transmit point 405-*b* may be coordinated according to a Coordinated Multi Point (CoMP) configuration (e.g., an LTE/LTE-A CoMP configuration) that includes a coordinated beamforming (CBF) mode, a dynamic point selection (DPS) mode, or a joint transmission (JT) mode. The JT mode may further include a NCJT mode.

At 425 or 430, the UE 415 may receive the set of communication configurations from the first transmit point 405-*a* and/or the second transmit point 405-*b*.

At 435 or 440, the UE 415 may receive an indication of a communication configuration from the set of communication configurations. The indication may be received from the first transmit point 405-*a*, the second transmit point 405-*b*, or both. At 445, the UE 415 may identify the indicated communication configuration. The indicated communication configuration may be a communication configuration based on processing a NCJT received from the first transmit point 405-*a* and the second transmit point 405-*b* according to a set of receive parameters defined for separate CCs in a CA mode. The communication configuration may include, for example, a resource allocation for each of the first transmit point 405-*a* and the second transmit point 405-*b*, a reference signal configuration, a control region configuration, a DCI configuration, a CSI configuration, and/or other configurations for the NCJT.

At 450, the UE 415 may receive the NCJT from the first transmit point 405-*a* and the second transmit point 405-*b*.

At 455, the UE 415 may process (e.g., demodulate, decode, etc.) the first transmission and the second transmission according to a set of receive parameters defined for separate CCs in the CA mode.

Figure 5:
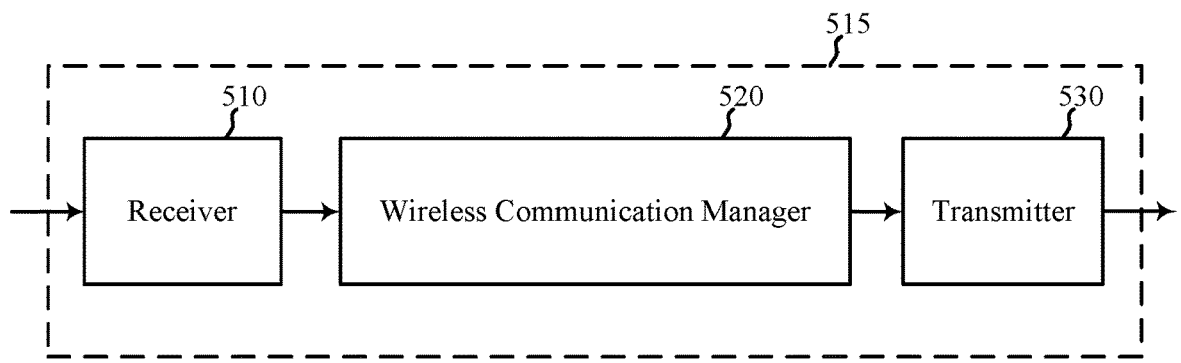
FIG. 5 shows a block diagram of an apparatus for receiving a NCJT from a plurality of transmit points, or transmitting a NCJT to a plurality of transmit points, in accordance with various aspects of the present disclosure.

FIG. 5 shows a block diagram 500 of an apparatus 515 for receiving a NCJT from a plurality of transmit points, or transmitting a NCJT to a plurality of transmit points, in accordance with various aspects of the present disclosure. The apparatus 515 may be an example of aspects of a UE 115 described with reference to FIG. 1, 2, 3, or 4. The apparatus 515 may include a receiver 510, a wireless communication manager 520, and a transmitter 530. The apparatus 515 may also include a processor. Each of these components may be in communication with each other.

The receiver 510 may receive information such as packets, user data, or control information associated with various information channels (e.g., control channels or data channels), and in some examples may receive a NCJT from a plurality of transmit points. Received information may be passed to other components of the apparatus 515, including the wireless communication manager 520. The receiver 510 may be an example of aspects of the UE transceiver(s) 830 described with reference to FIG. 8. The receiver 510 may include or be associated with a single antenna or a plurality of antennas.

The wireless communication manager 520 may be used to manage one or more aspects of wireless communication for the apparatus 515. In some examples, part of the wireless communication manager 520 may be incorporated into or shared with the receiver 510 or the transmitter 530. The wireless communication manager 520 may be used to manage the reception and processing of NCJT transmissions, or the preparation and transmission of NCJT transmissions. Received NCJT transmissions may be processed according to a set of receive parameters defined for separate CCs in a CA mode.

The transmitter 530 may transmit signals received from other components of the apparatus 515, including the wireless communication manager 520. In some examples, the transmitter 530 may be collocated with the receiver 510 in a transceiver. The transmitter 530 may be an example of aspects of the UE transceiver(s) 830 described with reference to FIG. 8. The transmitter 530 may include or be associated with a single antenna or a plurality of antennas.

Figure 6:
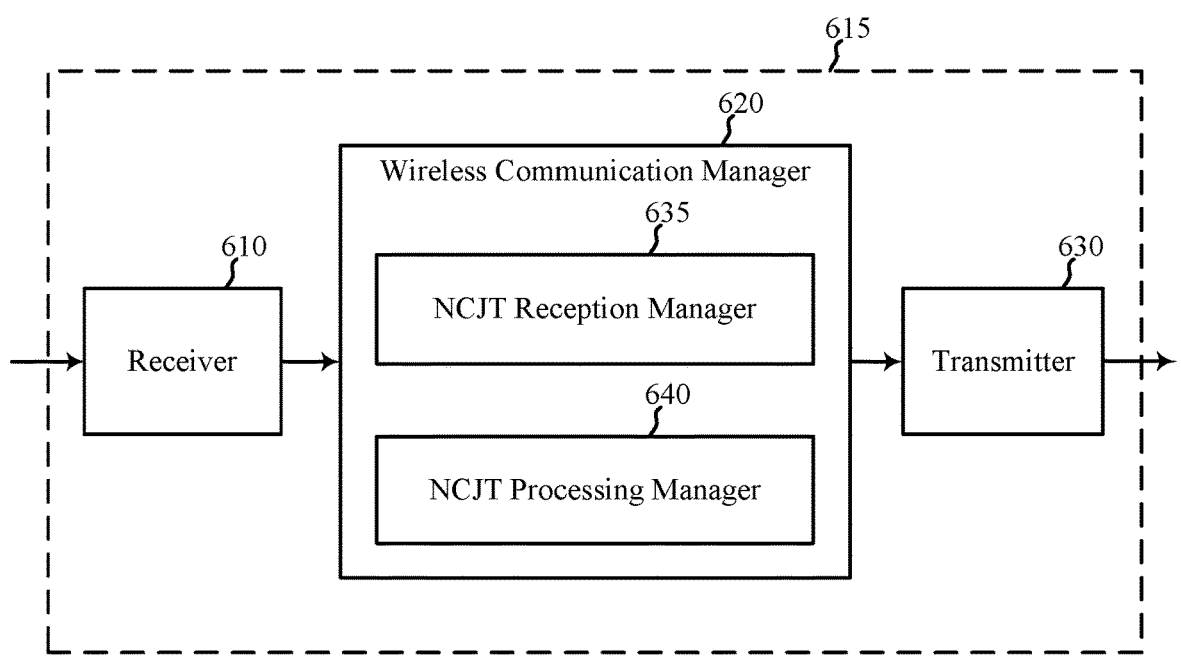
FIG. 6 shows a block diagram of an apparatus for receiving a NCJT from a plurality of transmit points, or transmitting a NCJT to a plurality of transmit points, in accordance with various aspects of the present disclosure.

FIG. 6 shows a block diagram 600 of an apparatus 615 for receiving a NCJT from a plurality of transmit points, or transmitting a NCJT to a plurality of transmit points, in accordance with various aspects of the present disclosure. The apparatus 615 may be an example of aspects of a UE 115 described with reference to FIG. 1, 2, 3, or 4, or an example of aspects of the apparatus 515 described with reference to FIG. 5. The apparatus 615 may include a receiver 610, a wireless communication manager 620, and a transmitter 630. The apparatus 615 may also include a processor. Each of these components may be in communication with each other.

The receiver 610 may receive information that may be passed to other components of the apparatus 615, including the wireless communication manager 620. In some examples, the receiver 610 may perform functions described with reference to the receiver 510 described with reference to FIG. 5. In some examples, the receiver 610 may be an example of aspects of the UE transceiver(s) 830 described with reference to FIG. 8. The receiver 610 may include or be associated with a single antenna or a plurality of antennas.

The wireless communication manager 620 may be an example of aspects of the wireless communication manager 520 described with reference to FIG. 5 or the UE wireless communication manager 850 described with reference to FIG. 8. The wireless communication manager 620 may include a NCJT reception manager 635 and a NCJT processing manager 640.

The NCJT reception manager 635 may be used to receive a non-coherent joint transmission including at least a first transmission from a first transmit point and a second transmission from a second transmit point, as described, for example, with reference to FIG. 2 or 4. The first transmission and the second transmission may be received on overlapping sets of frequency resources.

The NCJT processing manager 640 may be used to process the first transmission and the second transmission according to a set of receive parameters defined for separate CCs in a CA mode, as described, for example, with reference to FIG. 2 or 4.

In some examples, the first transmission and the second transmission may be received using a same receive chain of the receiver 610. In some examples, the first transmission and the second transmission may be received in accordance with independent transmission modes (which may be a same or different transmission modes). In some examples, each of the first transmission and the second transmission may include one codeword or two codewords. In some examples, the first transmission may be received in accordance with a first resource allocation, and the second transmission may be received in accordance with a second resource allocation. The first resource allocation and the second resource allocation may be aligned or non-aligned.

The transmitter 630 may transmit signals received from other components of the apparatus 615, including the wireless communication manager 620. In some examples, the transmitter 630 may perform functions described with reference to the transmitter 530 described with reference to FIG. 5. In some examples, the transmitter 630 may be collocated with the receiver 610 in a transceiver. In some examples, the transmitter 630 may be an example of aspects of the UE transceiver(s) 830 described with reference to FIG. 8. The transmitter 630 may include or be associated with a single antenna or a plurality of antennas.

Figure 7:
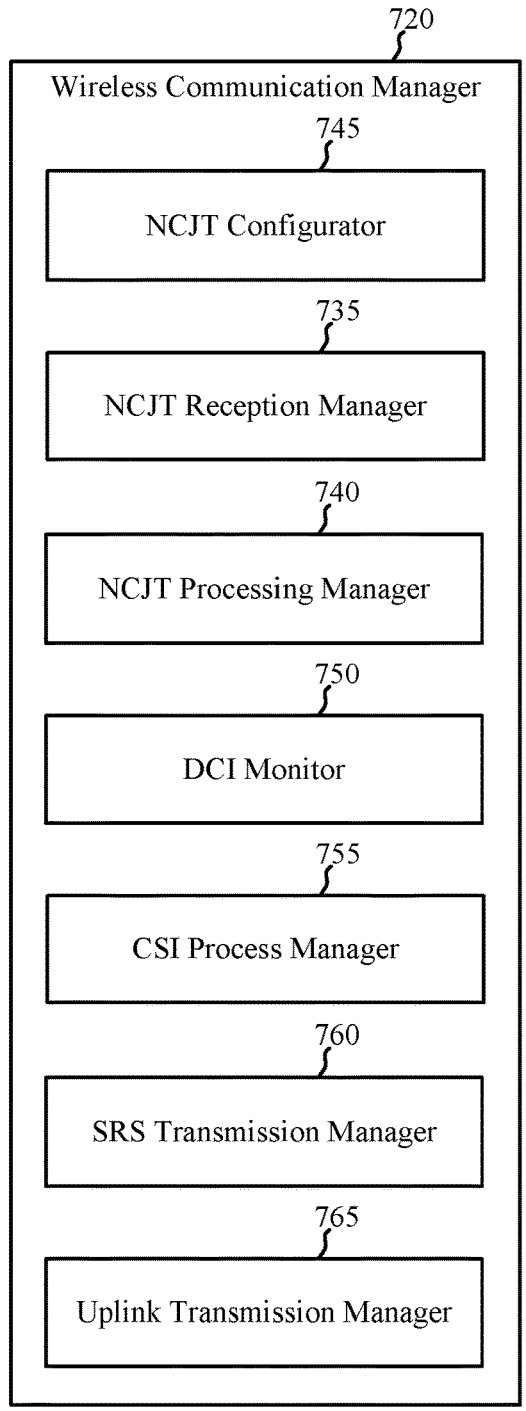
FIG. 7 shows a block diagram of a wireless communication manager, in accordance with various aspects of the present disclosure.

FIG. 7 shows a block diagram 700 of a wireless communication manager 720, in accordance with various aspects of the present disclosure. The wireless communication manager 720 may be an example of aspects of the wireless communication manager 520 or 620 described with reference to FIG. 5 or 6, or the UE wireless communication manager 850 described with reference to FIG. 8.

The wireless communication manager 720 may include a NCJT configurator 745, a NCJT reception manager 735, a NCJT processing manager 740, a DCI monitor 750, a CSI process manager 755, an SRS transmission manager 760, and an uplink transmission manager 765. Each of these components may communicate, directly or indirectly, with one another (e.g., via one or more buses). The NCJT reception manager 735 and NCJT processing manager 740 may be examples of aspects of the NCJT reception manager 635 and NCJT processing manager 640, respectively, described with reference to FIG. 6. In some examples, aspects of the NCJT configurator 745, DCI monitor 750, CSI process manager 755, or SRS transmission manager 760 may be incorporated into the NCJT processing manager 740.

The NCJT configurator 745 may be used to receive at least one of: independent resource allocations for a first transmission from a first transmit point and a second transmission from a second transmit point, independent scheduling decisions for the first transmission and the second transmission, or a combination thereof.

The NCJT reception manager 735 may be used to receive a non-coherent joint transmission including at least the first transmission from the first transmit point and the second transmission from the second transmit point. The first transmission and the second transmission may be received on overlapping sets of frequency resources.

The NCJT processing manager 740 may be used to process the first transmission and the second transmission according to a set of receive parameters defined for separate CCs in a CA mode.

In some examples, the NCJT reception manager 735 and/or NCJT processing manager 740 may be used to jointly process the first transmission and the second transmission. In these examples, the NCJT reception manager 735 and/or NCJT processing manager 740 may be used to sample the non-coherent joint transmission; perform a single Fourier transform on a set of samples of the non-coherent joint transmission; and de-map the first transmission and the second transmission from the single Fourier transform.

In some examples, the NCJT reception manager 735 and/or NCJT processing manager 740 may be used to separately process the first transmission and the second transmission. In these examples, the NCJT reception manager 735 and/or NCJT processing manager 740 may be used to sample the non-coherent joint transmission; perform, for the first transmission, a first Fourier transform on a first set of samples of the non-coherent joint transmission; perform, for the second transmission, a second Fourier transform on a second set of samples of the non-coherent joint transmission; and separately de-map the first transmission from the first Fourier transform and the second transmission from the second Fourier transform. The second set may differ from the first set.

In some examples, the NCJT processing manager 740 may determine to process the first transmission and the second transmission jointly or separately based at least in part on a configuration of the non-coherent joint transmission, or an indication received from the first transmit point or the second transmit point.

In some examples, the first transmission and the second transmission may be received using a same receive chain of the UE. In some examples, the first transmission and the second transmission may be received in accordance with independent transmission modes (which may be a same or different transmission modes). In some examples, each of the first transmission and the second transmission may include one codeword or two codewords. In some examples, the first transmission may be received in accordance with a first resource allocation, and the second transmission may be received in accordance with a second resource allocation. The first resource allocation and the second resource allocation may be aligned or non-aligned.

In some examples, orthogonal DMRS may be received as part of the first transmission and the second transmission. The orthogonal DMRSs may be based at least in part on a MU-MIMO DMRS configuration, a frequency domain multiplexed DMRS configuration, or a code division multiplexed (CDM) DMRS configuration. In some examples, the first transmission and the second transmission may be associated with a same VCI or different VCIs.

The DCI monitor 750 may be used to monitor for DCI. In some examples, the operation(s) performed by the DCI monitor 750 may include monitoring for DCI in a first PDCCH region associated with the first transmit point, and in a second PDCCH region associated with the second transmit point. When the first transmit point and the second transmit point are associated with different cell identities, the first PDCCH region and the second PDCCH region may include overlapping sets of resources. When the first transmit point and the second transmit point are associated with a same cell identity, the first PDCCH region and the second PDCCH region may include different sets of resources. In other examples, the operation(s) performed by the DCI monitor 750 may include monitoring for DCI received on a first ePDCCH region associated with the first transmit point and a second ePDCCH region associated with the second transmit point. The first ePDCCH and the second ePDCCH may be frequency domain multiplexed.

The CSI process manager 755 may be used to manage one or more CSI processes. In some examples, the operation(s) performed by the CSI process manager 755 may include managing a first CSI process for a first resource allocation associated with the first transmit point, and managing a second CSI process for a second resource allocation associated with the second transmit point. In other examples, the operation(s) performed by the CSI process manager 755 may include managing a joint CSI process for a same resource allocation associated with the first transmit point and the second transmit point. In some examples, the management of the joint CSI process may include managing a first component CSI process associated with the first transmit point, and managing a second component CSI process associated with the second transmit point.

The SRS transmission manager 760 may be used to trigger a transmission of, and transmitting, a SRS. In some examples, the SRS may be triggered based at least in part on first DCI received from the first transmit point, and the UE may refrain from triggering transmission of the SRS based at least in part on second DCI received from the second transmit point. In other examples, the SRS may be triggered based at least in part on: first DCI received from the first transmit point, second DCI received from the second transmit point, or a combination thereof. In these latter examples, the SRS may be transmitted based at least in part on a first set of SRS parameters associated with the first transmit point when the SRS is triggered based at least in part on the first DCI, or based at least in part on a second set of SRS parameters associated with the second transmit point when the SRS is triggered based at least in part on the second DCI, or based at least in part on a same set of SRS parameters associated with the first transmit point and the second transmit point when the SRS is triggered based at least in part on the first DCI and the second DCI.

The uplink transmission manager 765 may be used to receive at least one uplink grant for an uplink transmission. In some examples, the operation(s) performed by the uplink transmission manager 765 may include receiving at least one uplink grant for an uplink transmission on a single uplink channel, with the at least one uplink grant including a first uplink grant received from the first transmit point, a second uplink grant received from the second transmit point, or a combination thereof. In examples in which the first uplink grant and the second uplink grant are received, the first uplink grant and the second uplink grant may have the same content, and the UE need only detect and decode one of the uplink grants. In other examples, the operation(s) performed by the uplink transmission manager 765 may include receiving uplink grants for uplink transmissions on multiple uplink channels (e.g., for a second NCJT including at least a third transmission to the first transmit point and a fourth transmission to the second transmit point).

The uplink transmission manager 765 may also be used to transmit an uplink transmission to the first transmit point and/or the second transmit point in accordance with one or more received uplink grants. In some examples, the operation(s) performed by the uplink transmission manager 765 may include transmitting an uplink transmission to the first transmit point or the second transmit point. In other examples, the operation(s) performed by the uplink transmission manager 765 may include transmitting the second NCJT, including transmitting the third transmission to the first transmit point and the fourth transmission to the second transmit point. In some examples, the third transmission and the fourth transmission may be processed using different precoders.

Figure 8:
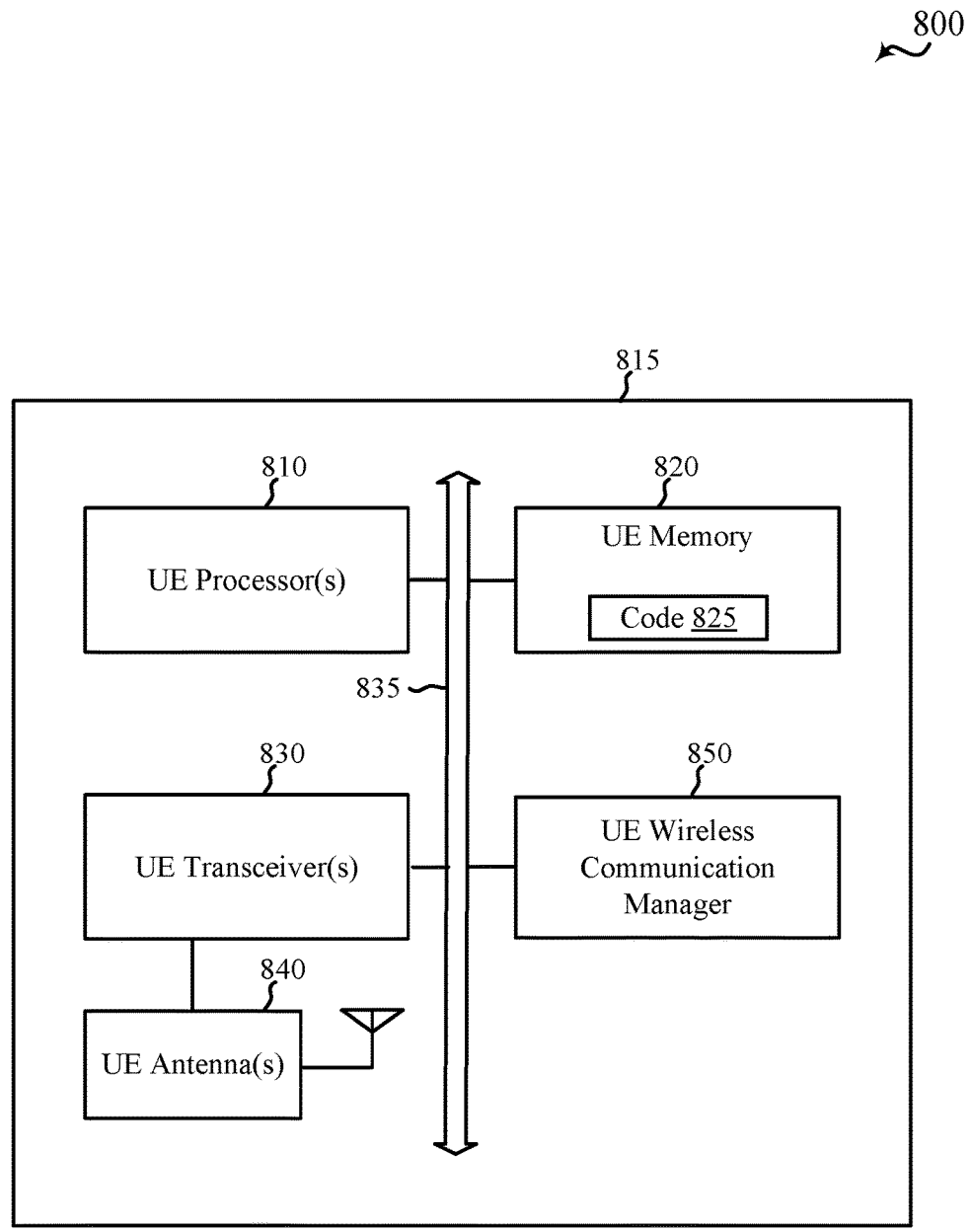
FIG. 8 shows a block diagram of a UE for use in wireless communication, in accordance with various aspects of the present disclosure.

FIG. 8 shows a block diagram 800 of a UE 815 for use in wireless communication, in accordance with various aspects of the present disclosure. The UE 815 may be include or be part of a personal computer (e.g., a laptop computer, a netbook computer, a tablet computer, etc.), a cellular telephone, a smart phone, a PDA, a DVR, an internet appliance, a gaming console, an e-reader, etc. The UE 815 may, in some examples, have an internal power supply (not shown), such as a small battery, to facilitate mobile operation. In some examples, the UE 815 may be an example of aspects of one or more of the UEs 115, 215, 315, or 415 described with reference to FIG. 1, 2, 3, or 4, or aspects of one or more of the apparatuses 515 or 615 described with reference to FIG. 5 or 6. The UE 815 may be configured to implement at least some of the UE or apparatus techniques and functions described with reference to other figures.

The UE 815 may include at least one processor (represented by UE processor(s) 810), a UE memory 820, at least one UE transceiver (represented by UE transceiver(s) 830), at least one antenna (represented by UE antenna(s) 840), or a UE wireless communication manager 850. Each of these components may be in communication with each other, directly or indirectly, over one or more buses 865.

The UE memory 820 may include random access memory (RAM) or read-only memory (ROM). The UE memory 820 may store computer-readable, computer-executable code 825 containing instructions that are configured to, when executed, cause the UE processor(s) 810 to perform various functions described herein related to wireless communication, such as receiving or transmitting NCH's. Alternatively, the computer-executable code 825 may not be directly executable by the UE processor(s) 810 but be configured to cause the UE 815 (e.g., when compiled and executed) to perform various of the functions described herein.

The UE processor(s) 810 may include one or more intelligent hardware devices, e.g., a central processing unit (CPU), a microcontroller, an ASIC, etc. The UE processor(s) 810 may process information received through the UE transceiver(s) 830 or information to be sent to the UE transceiver(s) 830 for transmission through the UE antenna(s) 840. The UE processor(s) 810 may handle, alone or in connection with the UE wireless communication manager 850, various aspects of communicating over (or managing communications over) one or more radio frequency spectrum bands.

The UE transceiver(s) 830 may be configured to modulate packets and provide the modulated packets to the UE antenna(s) 840 for transmission. The UE transceiver(s) 830 may also demodulate packets received from the UE antenna(s) 840. The UE transceiver(s) 830 may, in some examples, be implemented as one or more UE transmitters and one or more separate UE receivers. The UE transceiver(s) 830 may be configured to communicate bi-directionally, via the UE antenna(s) 840, with one or more access points (e.g., eNBs, base stations, or WLAN access points). While the UE 815 may include a single antenna, there may be examples in which the UE 815 may include multiple antennas.

The UE wireless communication manager 850 may be configured to coordinate or manage wireless communications for the UE 815. The UE wireless communication manager 850, or portions of it, may include a processor, or some or all of the functions of the UE wireless communication manager 850 may be performed by one or more of the UE processor(s) 810 or in connection with the UE processor(s) 810. In some examples, the UE wireless communication manager 850 may be an example of the wireless communication manager 520, 620, or 720 described with reference to FIG. 5, 6, or 7.

Figure 9:
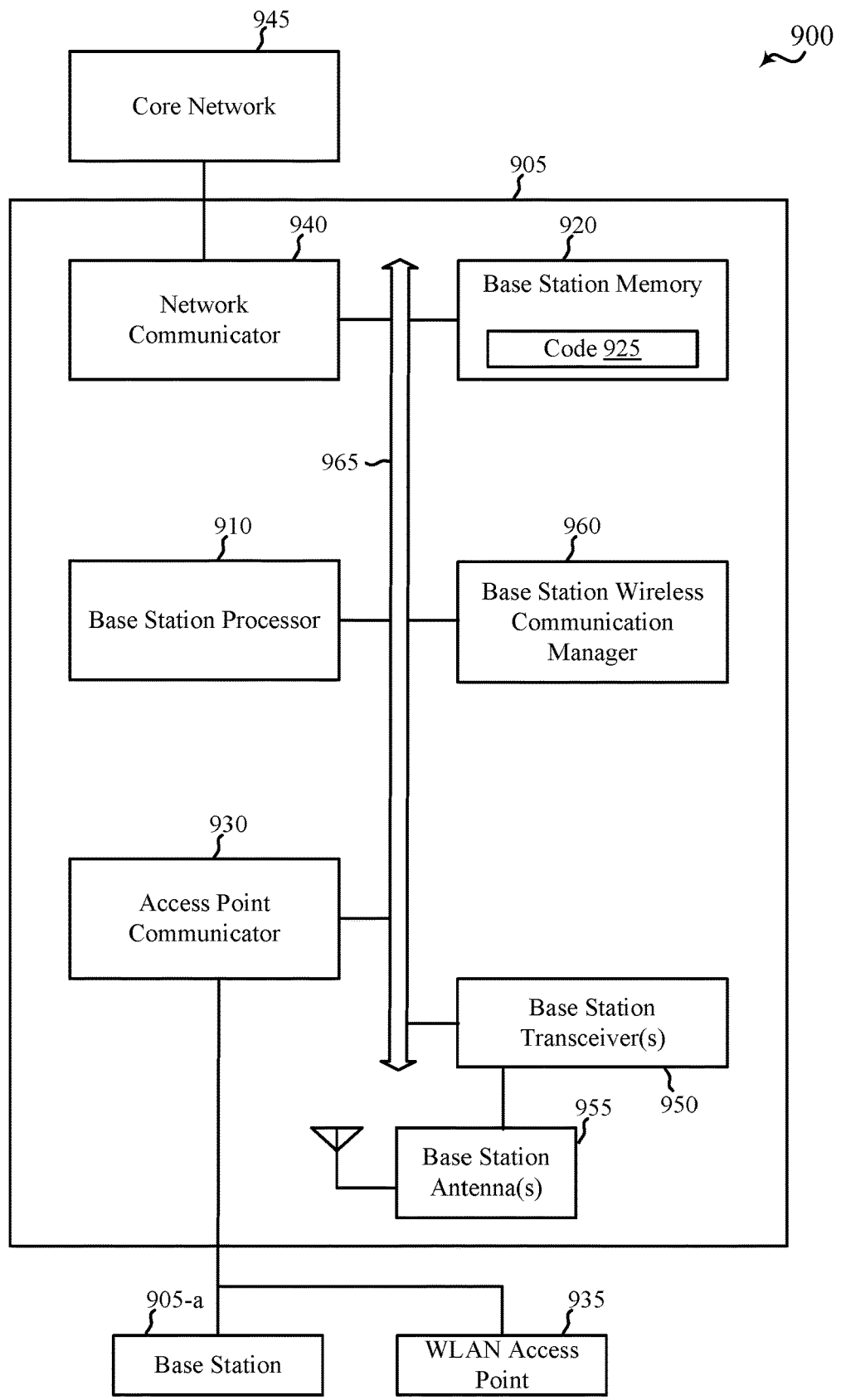
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of aspects of one or more of the base stations 105 or transmit points 205-a, 205-b, 305-a, 305-a, 405-a, or 405-b described with reference to FIG. 1, 2, 3, or 4. The base station 905 may be configured to implement or facilitate at least some of the base station techniques and functions described with reference to other figures.

The base station 905 may include a base station processor 910, a base station memory 920, at least one base station transceiver (represented by base station transceiver(s) 950), at least one base station antenna (represented by base station antenna(s) 955), or a base station wireless communication manager 960. The base station 905 may also include one or more of an access point communicator 930 or a network communicator 940. Each of these components may be in communication with each other, directly or indirectly, over one or more buses 965.

The base station memory 920 may include RAM or ROM. The base station memory 920 may store computer-readable, computer-executable code 925 containing instructions that are configured to, when executed, cause the base station processor 910 to perform various functions described herein related to wireless communication, such as transmitting or receiving NCJT's. Alternatively, the computer-executable code 925 may not be directly executable by the base station processor 910 but be configured to cause the base station 905 (e.g., when compiled and executed) to perform various of the functions described herein.

The base station processor 910 may include an intelligent hardware device, e.g., a CPU, a microcontroller, an ASIC, etc. The base station processor 910 may process information received through the base station transceiver(s) 950, the access point communicator 930, or the network communicator 940. The base station processor 910 may also process information to be sent to the transceiver(s) 950 for transmission through the antenna(s) 955, to the access point communicator 930, for transmission to one or more other access points (e.g., base station 905-a or WLAN access point 935), or to the network communicator 940 for transmission to a core network 945, which may be an example of one or more aspects of the core network 130 described with reference to FIG. 1. The base station processor 910 may handle, alone or in connection with the base station wireless communication manager 960, various aspects of communicating over (or managing communications over) one or more radio frequency spectrum bands.

The base station transceiver(s) 950 may include a modem configured to modulate packets and provide the modulated packets to the base station antenna(s) 955 for transmission, and to demodulate packets received from the base station antenna(s) 955. The base station transceiver(s) 950 may, in some examples, be implemented as one or more base station transmitters and one or more separate base station receivers. The base station transceiver(s) 950 may be configured to communicate bi-directionally, via the antenna(s) 955, with one or more UEs or apparatuses, such as one or more of the UEs 115, 215, 315, 415, or 815 described with reference to FIG. 1, 2, 3, 4, or 8, or one or more of the apparatuses 515 or 615 described with reference to FIG. 5 or 6. The base station 905 may, for example, include multiple base station antennas 955 (e.g., an antenna array). The base station 905 may communicate with the core network 945 through the network communicator 940. The base station 905 may also communicate with other access points, such as the base station 905-a and the WLAN access point 935, using the access point communicator 930.

The base station wireless communication manager 960 may be configured to perform or control some or all of the base station techniques or functions described with reference to other figures. The base station wireless communication manager 960, or portions of it, may include a processor, or some or all of the functions of the base station wireless communication manager 960 may be performed by the base station processor 910 or in connection with the base station processor 910.

Figure 10:
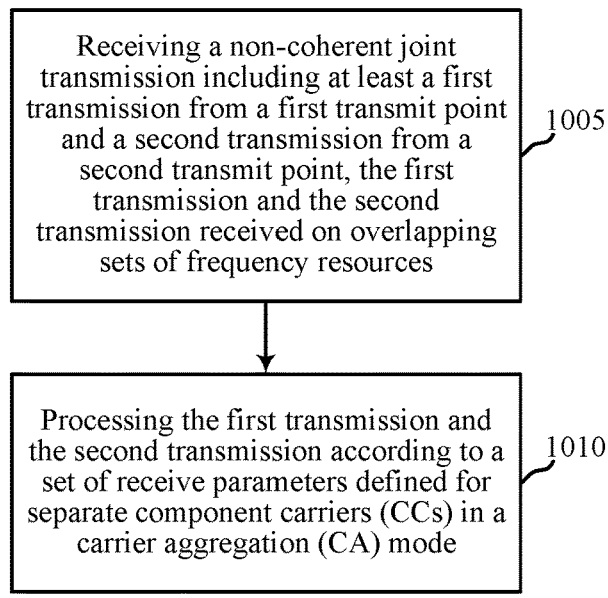
FIG. 10 is a flow chart illustrating an example of a method for wireless communication at a UE, in accordance with various aspects of the present disclosure.

FIG. 10 is a flow chart illustrating an example of a method 1000 for wireless communication at a UE, in accordance with various aspects of the present disclosure. For clarity, the method 1000 is described below with reference to aspects of one or more of the UEs 115, 215, 315, 415, or 815 described with reference to FIG. 1, 2, 3, 4, or 8, or aspects of one or more of the apparatuses 515 or 615 described with reference to FIG. 5 or 6. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include receiving a non-coherent joint transmission including at least a first transmission from a first transmit point and a second transmission from a second transmit point. The first transmission and the second transmission may be received on overlapping sets of frequency resources. The operation(s) at block 1005 may be performed using the wireless communication manager 520, 620, or 720 described with reference to FIG. 5, 6, or 7, the UE wireless communication manager 850 described with reference to FIG. 8, or the NCJT reception manager 535, 635, or 735 described with reference to FIG. 5, 6, or 7.

At block 1010, the method 1000 may include processing the first transmission and the second transmission according to a set of receive parameters defined for separate CCs in a CA mode. The operation(s) at block 1010 may be performed using the wireless communication manager 520, 620, or 720 described with reference to FIG. 5, 6, or 7, the UE wireless communication manager 850 described with reference to FIG. 8, or the NCJT processing manager 540, 640, or 740 described with reference to FIG. 5, 6, or 7.

In some examples of the method 1000, the first transmission and the second transmission may be received using a same receive chain of the UE. In some examples, the first transmission and the second transmission may be received in accordance with independent transmission modes (which may be a same or different transmission modes). In some examples, each of the first transmission and the second transmission may include one codeword or two codewords. In some examples, the first transmission may be received in accordance with a first resource allocation, and the second transmission may be received in accordance with a second resource allocation. The first resource allocation and the second resource allocation may be aligned or non-aligned.

In some examples of the method 1000, orthogonal DMRS may be received as part of the first transmission and the second transmission. The orthogonal DMRSs may be based at least in part on a MU-MIMO DMRS configuration, a frequency domain multiplexed DMRS configuration, or a code division multiplexed (CDM) DMRS configuration. In some examples, the first transmission and the second transmission may be associated with a same VCI or different VCIs.

Figure 11:
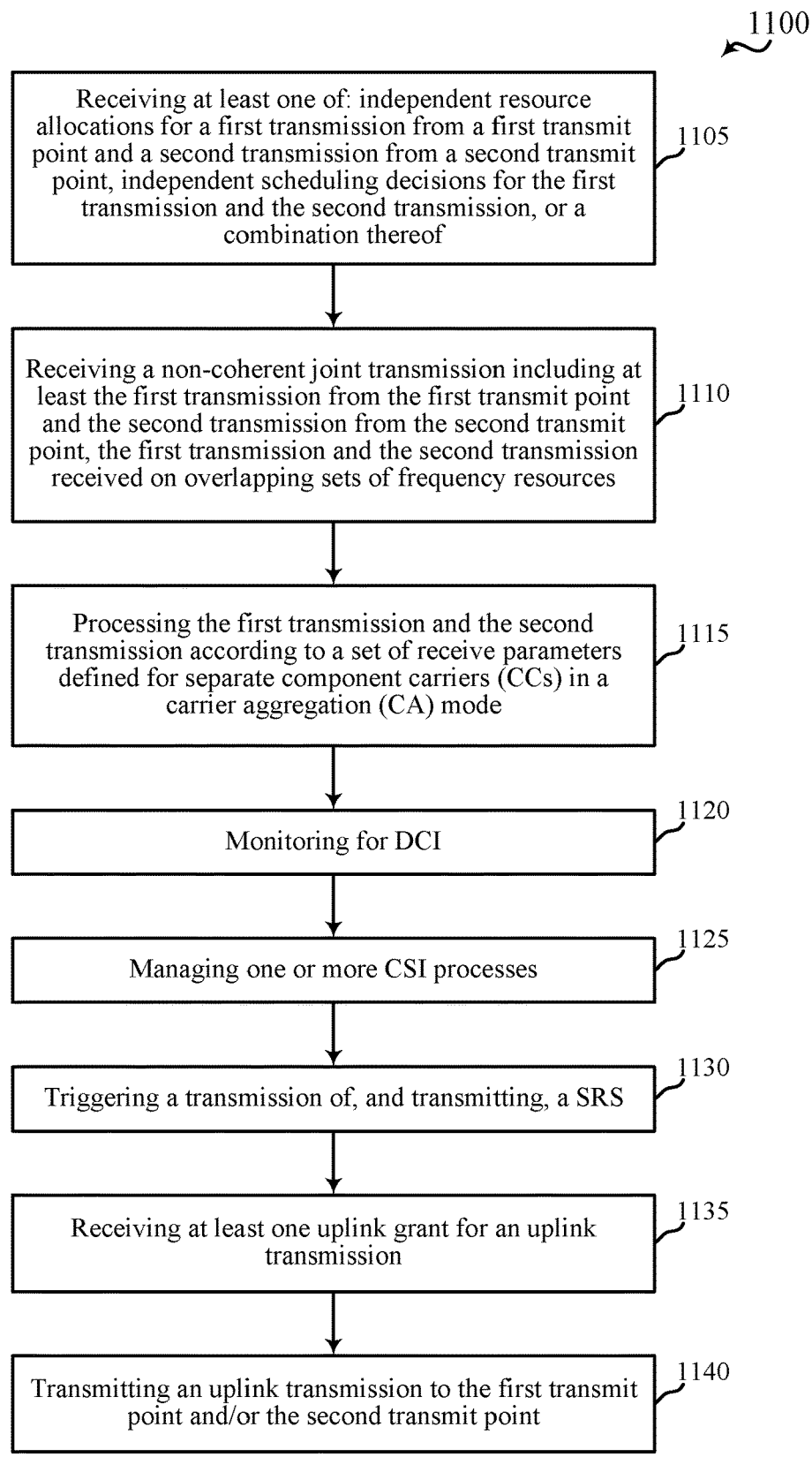
FIG. 11 is a flow chart illustrating an example of a method for wireless communication at a UE, in accordance with various aspects of the present disclosure.

FIG. 11 is a flow chart illustrating an example of a method 1100 for wireless communication at a UE, in accordance with various aspects of the present disclosure. For clarity, the method 1100 is described below with reference to aspects of one or more of the UEs 115, 215, 315, 415, or 815 described with reference to FIG. 1, 2, 3, 4, or 8, or aspects of one or more of the apparatuses 515 or 615 described with reference to FIG. 5 or 6. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include receiving at least one of: independent resource allocations for a first transmission from a first transmit point and a second transmission from a second transmit point, independent scheduling decisions for the first transmission and the second transmission, or a combination thereof. The operation(s) at block 1105 may be performed using the wireless communication manager 520, 620, or 720 described with reference to FIG. 5, 6, or 7, the UE wireless communication manager 850 described with reference to FIG. 8, or the NCJT configurator 745 described with reference to FIG. 7.

At block 1110, the method 1100 may include receiving a non-coherent joint transmission including at least the first transmission from the first transmit point and the second transmission from the second transmit point. The first transmission and the second transmission may be received on overlapping sets of frequency resources. The operation(s) at block 1110 may be performed using the wireless communication manager 520, 620, or 720 described with reference to FIG. 5, 6, or 7, the UE wireless communication manager 850 described with reference to FIG. 8, or the NCJT reception manager 535, 635, or 735 described with reference to FIG. 5, 6, or 7.

At block 1115, the method 1100 may include processing the first transmission and the second transmission according to a set of receive parameters defined for separate CCs in a CA mode. The operation(s) at block 1115 may be performed using the wireless communication manager 520, 620, or 720 described with reference to FIG. 5, 6, or 7, the UE wireless communication manager 850 described with reference to FIG. 8, or the NCJT processing manager 540, 640, or 740 described with reference to FIG. 5, 6, or 7.

At block 1120, the method 1100 may include monitoring for DCI. In some examples, the operation(s) at block 1120 may include monitoring for DCI in a first PDCCH region associated with the first transmit point, and in a second PDCCH region associated with the second transmit point. When the first transmit point and the second transmit point are associated with different cell identities, the first PDCCH region and the second PDCCH region may include overlapping sets of resources. When the first transmit point and the second transmit point are associated with a same cell identity, the first PDCCH region and the second PDCCH region may include different sets of resources. In other examples, the operation(s) at block 1120 may include monitoring for DCI received on a first ePDCCH region associated with the first transmit point and a second ePDCCH region associated with the second transmit point. The first ePDCCH and the second ePDCCH may be frequency domain multiplexed. The operation(s) at block 1120 may be performed using the wireless communication manager 520, 620, or 720 described with reference to FIG. 5, 6, or 7, the UE wireless communication manager 850 described with reference to FIG. 8, or the DCI monitor 750 described with reference to FIG. 7.

At block 1125, the method 1100 may include managing one or more CSI processes. In some examples, the operation(s) at block 1125 may include managing a first CSI process for a first resource allocation associated with the first transmit point, and managing a second CSI process for a second resource allocation associated with the second transmit point. In other examples, the operation(s) at block 1125 may include managing a joint CSI process for a same resource allocation associated with the first transmit point and the second transmit point. In some examples, the management of the joint CSI process may include managing a first component CSI process associated with the first transmit point, and managing a second component CSI process associated with the second transmit point. The operation(s) at block 1125 may be performed using the wireless communication manager 520, 620, or 720 described with reference to FIG. 5, 6, or 7, the UE wireless communication manager 850 described with reference to FIG. 8, or the CSI process manager 755 described with reference to FIG. 7.

At block 1130, the method 1100 may include triggering a transmission of, and transmitting, a SRS. In some examples, the SRS may be triggered based at least in part on first DCI received from the first transmit point, and the UE may refrain from triggering transmission of the SRS based at least in part on second DCI received from the second transmit point. In other examples, the SRS may be triggered based at least in part on: first DCI received from the first transmit point, second DCI received from the second transmit point, or a combination thereof. In these latter examples, the SRS may be transmitted based at least in part on a first set of SRS parameters associated with the first transmit point when the SRS is triggered based at least in part on the first DCI, or based at least in part on a second set of SRS parameters associated with the second transmit point when the SRS is triggered based at least in part on the second DCI, or based at least in part on a same set of SRS parameters associated with the first transmit point and the second transmit point when the SRS is triggered based at least in part on the first DCI and the second DCI. The operation(s) at block 1130 may be performed using the wireless communication manager 520, 620, or 720 described with reference to FIG. 5, 6, or 7, the UE wireless communication manager 850 described with reference to FIG. 8, or the SRS transmission manager 760 described with reference to FIG. 7.

At block 1135, the method 1100 may include receiving at least one uplink grant for an uplink transmission. In some examples, the operation(s) at block 1135 may include receiving at least one uplink grant for an uplink transmission on a single uplink channel, with the at least one uplink grant including a first uplink grant received from the first transmit point, a second uplink grant received from the second transmit point, or a combination thereof. In examples in which the first uplink grant and the second uplink grant are received, the first uplink grant and the second uplink grant may have the same content, and the UE need only detect and decode one of the uplink grants. In other examples, the operation(s) at block 1135 may include receiving uplink grants for uplink transmissions on multiple uplink channels (e.g., for a second NCJT including at least a third transmission to the first transmit point and a fourth transmission to the second transmit point). The operation(s) at block 1135 may be performed using the wireless communication manager 520, 620, or 720 described with reference to FIG. 5, 6, or 7, the UE wireless communication manager 850 described with reference to FIG. 8, or the uplink transmission manager 765 described with reference to FIG. 7.

At block 1140, the method 1100 may include transmitting an uplink transmission to the first transmit point and/or the second transmit point in accordance with the uplink grant(s) received at block 1135. In some examples, the operation(s) at block 1140 may include transmitting an uplink transmission to the first transmit point or the second transmit point. In other examples, the operation(s) at block 1140 may include transmitting the second NCJT, including transmitting the third transmission to the first transmit point and the fourth transmission to the second transmit point. In some examples, the third transmission and the fourth transmission may be processed using different precoders. The operation(s) at block 1140 may be performed using the wireless communication manager 520, 620, or 720 described with reference to FIG. 5, 6, or 7, the UE wireless communication manager 850 described with reference to FIG. 8, or the uplink transmission manager 765 described with reference to FIG. 7.

Figure 12:
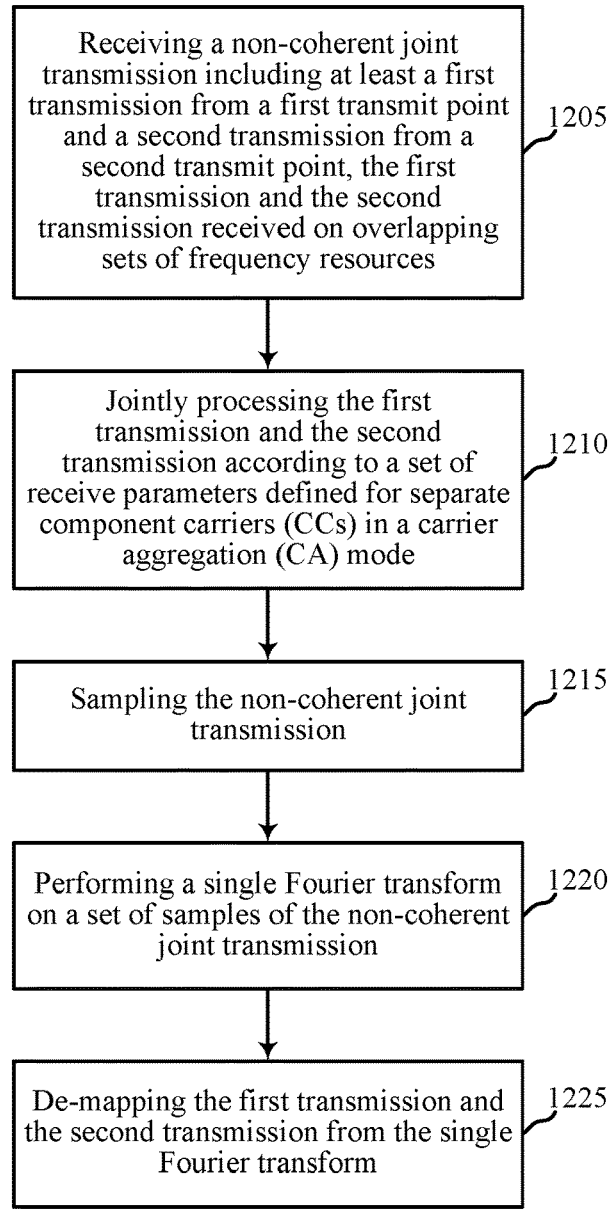
FIG. 12 is a flow chart illustrating an example of a method for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to aspects of one or more of the UEs 115, 215, 315, 415, or 815 described with reference to FIG. 1, 2, 3, 4, or 8, or aspects of one or more of the apparatuses 515 or 615 described with reference to FIG. 5 or 6. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include receiving a non-coherent joint transmission including at least a first transmission from a first transmit point and a second transmission from a second transmit point. The first transmission and the second transmission may be received on overlapping sets of frequency resources. The operation(s) at block 1205 may be performed using the wireless communication manager 520, 620, or 720 described with reference to FIG. 5, 6, or 7, the UE wireless communication manager 850 described with reference to FIG. 8, or the NCJT reception manager 535, 635, or 735 described with reference to FIG. 5, 6, or 7.

At block 1210, the method 1200 may include jointly processing the first transmission and the second transmission according to a set of receive parameters defined for separate CCs in a CA mode. The operation(s) at block 1210 may be performed using the wireless communication manager 520, 620, or 720 described with reference to FIG. 5, 6, or 7, the UE wireless communication manager 850 described with reference to FIG. 8, or the NCJT processing manager 540, 640, or 740 described with reference to FIG. 5, 6, or 7.

At block 1215, the method 1200 may include sampling the non-coherent joint transmission. At block 1220, the method 1200 may include performing a single Fourier transform on a set of samples of the non-coherent joint transmission. At block 1225, the method 1200 may include de-mapping the first transmission and the second transmission from the single Fourier transform. The operation(s) at block 1215, 1220, or 1225 may be performed using the wireless communication manager 520, 620, or 720 described with reference to FIG. 5, 6, or 7, the UE wireless communication manager 850 described with reference to FIG. 8, or the NCJT reception manager 535, 635, or 735 or NCJT processing manager 540, 640, or 740 described with reference to FIG. 5, 6, or 7. In some examples, the operation(s) at block 1215, 1220, or 1225 may be performed as part of the operation(s) at block 1205 or 1210.

Figure 13:
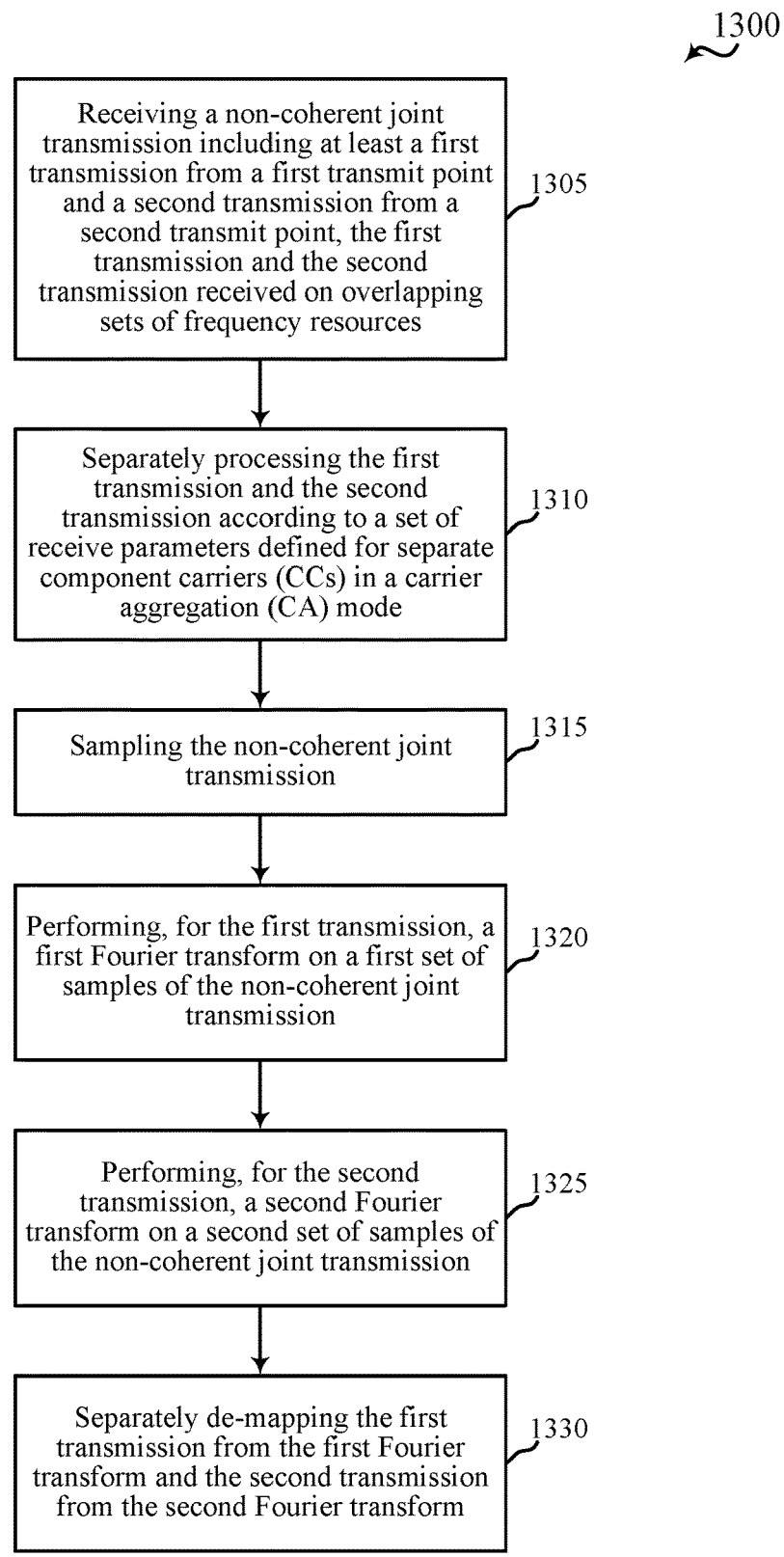
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs 115, 215, 315, 415, or 815 described with reference to FIG. 1, 2, 3, 4, or 8, or aspects of one or more of the apparatuses 515 or 615 described with reference to FIG. 5 or 6. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving a non-coherent joint transmission including at least a first transmission from a first transmit point and a second transmission from a second transmit point. The first transmission and the second transmission may be received on overlapping sets of frequency resources. The operation(s) at block 1305 may be performed using the wireless communication manager 520, 620, or 720 described with reference to FIG. 5, 6, or 7, the UE wireless communication manager 850 described with reference to FIG. 8, or the NCJT reception manager 535, 635, or 735 described with reference to FIG. 5, 6, or 7.

At block 1310, the method 1300 may include separately processing the first transmission and the second transmission according to a set of receive parameters defined for separate CCs in a CA mode. The operation(s) at block 1310 may be performed using the wireless communication manager 520, 620, or 720 described with reference to FIG. 5, 6, or 7, the UE wireless communication manager 850 described with reference to FIG. 8, or the NCJT processing manager 540, 640, or 740 described with reference to FIG. 5, 6, or 7.

At block 1315, the method 1300 may include sampling the non-coherent joint transmission. At block 1320, the method 1300 may include performing, for the first transmission, a first Fourier transform on a first set of samples of the non-coherent joint transmission. At block 1325, the method 1300 may include performing, for the second transmission, a second Fourier transform on a second set of samples of the non-coherent joint transmission. The second set may differ from the first set. At block 1330, the method 1300 may include separately de-mapping the first transmission from the first Fourier transform and the second transmission from the second Fourier transform. The operation(s) at block 1315, 1320, 1325, or 1330 may be performed using the wireless communication manager 520, 620, or 720 described with reference to FIG. 5, 6, or 7, the UE wireless communication manager 850 described with reference to FIG. 8, or the NCJT reception manager 535, 635, or 735 or NCJT processing manager 540, 640, or 740 described with reference to FIG. 5, 6, or 7. In some examples, the operation(s) at block 1315, 1320, 1325, or 1330 may be performed as part of the operation(s) at block 1305 or 1310.

In some examples, the method 1200 or 1300 may include determining to process the first transmission and the second transmission jointly or separately based at least in part on a configuration of the non-coherent joint transmission, or an indication received from the first transmit point or the second transmit point.

It is noted that the methods 1000, 1100, 1200, and 1300 described with reference to FIGS. 10, 11, 12, and 13 show examples of implementations of the techniques described in the present disclosure, and that the operations of the methods 1000, 1100, 1200, and 1300 may be rearranged or otherwise modified such that other implementations are possible. In some examples, aspects of the methods 1000, 1100, 1200, or 1300 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1X, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving, at the UE, a non-coherent joint transmission including at least a first transmission from a first transmit point associated with a first demodulation reference signal (DMRS) and a second transmission from a second transmit point associated with a second DMRS orthogonal to the first DMRS, the first transmission and the second transmission received on overlapping sets of frequency resources; and
   processing the first transmission and the second transmission according to a set of receive parameters defined for separate component carriers (CCs).

2. The method of claim 1, further comprising:
   receiving at least one of: independent resource allocations for the first transmission and the second transmission, independent scheduling decisions for the first transmission and the second transmission, or a combination thereof.

3. The method of claim 1, further comprising:
   receiving the first transmission and the second transmission using a same receive chain.

4. The method of claim 1, further comprising:
   receiving one codeword or two codewords in each of the first transmission and the second transmission.

5. The method of claim 1, further comprising:
   receiving the first transmission in accordance with a first resource allocation; and
   receiving the second transmission in accordance with a second resource allocation, wherein the first resource allocation and the second resource allocation are non-aligned.

6. The method of claim 1, wherein the processing of the first transmission and the second transmission comprises:
   jointly processing the first transmission and the second transmission.

7. The method of claim 6, further comprising:
   sampling the non-coherent joint transmission;
   performing a single Fourier transform on a set of samples of the non-coherent joint transmission; and
   de-mapping the first transmission and the second transmission from the single Fourier transform.

8. The method of claim 1, wherein the processing of the first transmission and the second transmission comprises:
   separately processing the first transmission and the second transmission.

9. The method of claim 8, further comprising:
   sampling the non-coherent joint transmission;
   performing, for the first transmission, a first Fourier transform on a first set of samples of the non-coherent joint transmission;
   performing, for the second transmission, a second Fourier transform on a second set of samples of the non-coherent joint transmission, wherein the second set differs from the first set; and
   separately de-mapping the first transmission from the first Fourier transform and the second transmission from the second Fourier transform.

10. The method of claim 1, further comprising:
    determining to process the first transmission and the second transmission jointly or separately based at least in part on: a configuration of the non-coherent joint transmission, or an indication received from the first transmit point or the second transmit point.

11. The method of claim 1, further comprising:
    receiving the first DMRS and the second DMRS as part of the first transmission and the second transmission, the first and second DMRSs based at least in part on: a multi-user multiple input multiple output (MU-MIMO) DMRS configuration, a frequency domain multiplexed DMRS configuration, or a code division multiplexed (CDM) DMRS configuration.

12. The method of claim 1, wherein the first transmission and the second transmission are associated with a same virtual cell identity (VCI) or different VCIs.

13. The method of claim 1, further comprising:
    managing a first channel state information (CSI) process for a first resource allocation associated with the first transmit point; and
    managing a second CSI process for a second resource allocation associated with the second transmit point.

14. The method of claim 1, further comprising:
    managing a joint channel state information (CSI) process for a same resource allocation associated with the first transmit point and the second transmit point.

15. The method of claim 14, wherein the management of the joint CSI process comprises:

managing a first component CSI process associated with the first transmit point, wherein the first component CSI process carries a first CSI report conditioned on a second CSI report; and managing a second component CSI process associated with the second transmit point, wherein the second component CSI process carries the second CSI report conditioned on the first CSI report.

16. The method of claim 1, further comprising:

monitoring for downlink control information (DCI) in a first physical downlink control channel (PDCCH) region associated with the first transmit point, and in a second PDCCH region associated with the second transmit point.

17. The method of claim 16, wherein the first transmit point and the second transmit point are associated with different cell identities, and the first PDCCH region and the second PDCCH region include overlapping sets of resources.

18. The method of claim 16, wherein the first transmit point and the second transmit point are associated with a same cell identity, and the first PDCCH region and the second PDCCH region include different sets of resources.

19. The method of claim 1, further comprising:

triggering a transmission of a sounding reference signal (SRS) based at least in part on first downlink control information (DCI) received from the first transmit point; and refraining from triggering transmission of the SRS based at least in part on second DCI received from the second transmit point.

20. The method of claim 1, further comprising:

triggering a transmission of a sounding reference signal (SRS) based at least in part on: first downlink control information (DCI) received from the first transmit point, second DCI received from the second transmit point, or a combination thereof.

21. The method of claim 20, further comprising:

transmitting the SRS based at least in part on: a first set of SRS parameters associated with the first transmit point when the SRS is triggered based at least in part on the first DCI, a second set of SRS parameters associated with the second transmit point when the SRS is triggered based at least in part on the second DCI, or a same set of SRS parameters associated with the first transmit point and the second transmit point when the SRS is triggered based at least in part on the first DCI and the second DCI.

22. The method of claim 1, further comprising:

receiving at least one uplink grant for an uplink transmission on a single uplink channel, the at least one uplink grant comprising: a first uplink grant received from the first transmit point, a second uplink grant received from the second transmit point, or a combination thereof.

23. The method of claim 22, wherein the first uplink grant and the second uplink grant are received and have a same content.

24. The method of claim 1, further comprising:

transmitting a second non-coherent joint transmission including at least a third transmission to the first transmit point and a fourth transmission to the second transmit point.

25. The method of claim 24, further comprising:

processing the third transmission and the fourth transmission using different precoders.

26. An apparatus for wireless communication at a user equipment (UE), comprising:

means for receiving, at the UE, a non-coherent joint transmission including at least a first transmission from a first transmit point associated with a first demodulation reference signal (DMRS) and a second transmission from a second transmit point associated with a second DMRS orthogonal to the first DMRS, the first transmission and the second transmission received on overlapping sets of frequency resources; and means for processing the first transmission and the second transmission according to a set of receive parameters defined for separate component carriers (CCs) in a carrier aggregation (CA) mode.

27. The apparatus of claim 26, further comprising:

means for receiving at least one of: independent resource allocations for the first transmission and the second transmission, independent scheduling decisions for the first transmission and the second transmission, or a combination thereof.

28. The apparatus of claim 26, further comprising:

means for receiving the first transmission and the second transmission using a same receive chain.

29. An apparatus for wireless communication at a user equipment (UE), comprising:

a processor; and
memory in electronic communication with the processor; the processor and the memory configured to:

receive, at the UE, a non-coherent joint transmission including at least a first transmission from a first transmit point associated with a first demodulation reference signal (DMRS) and a second transmission from a second transmit point associated with a second DMRS orthogonal to the first DMRS, the first transmission and the second transmission received on overlapping sets of frequency resources; and process the first transmission and the second transmission according to a set of receive parameters defined for separate component carriers (CCs) in a carrier aggregation (CA) mode.

30. A non-transitory computer-readable medium storing computer-executable code for wireless communication at a user equipment (UE), the code executable by a processor to:

receive, at the UE, a non-coherent joint transmission including at least a first transmission from a first transmit point associated with a first demodulation reference signal (DMRS) and a second transmission from a second transmit point associated with a second DMRS orthogonal to the first DMRS, the first transmission and the second transmission received on overlapping sets of frequency resources; and process the first transmission and the second transmission according to a set of receive parameters defined for separate component carriers (CCs) in a carrier aggregation (CA) mode.

* * * * *